US009967444B2

(12) United States Patent
Choi et al.

(10) Patent No.: US 9,967,444 B2
(45) Date of Patent: May 8, 2018

(54) APPARATUS AND METHOD FOR CAPTURING IMAGE IN ELECTRONIC DEVICE

(71) Applicant: Samsung Electronics Co., Ltd., Gyeonggi-do (KR)

(72) Inventors: Jongchul Choi, Gyeonggi-do (KR); Heesung Kim, Seoul (KR); Hyungjin Park, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 301 days.

(21) Appl. No.: 14/613,245

(22) Filed: Feb. 3, 2015

(65) Prior Publication Data

US 2015/0222880 A1 Aug. 6, 2015

(30) Foreign Application Priority Data

Feb. 3, 2014 (KR) ........................ 10-2014-0012017

(51) Int. Cl.
| | | |
|---|---|---|
| H04N 13/02 | (2006.01) |
| H04N 5/225 | (2006.01) |
| G03B 37/04 | (2006.01) |
| H04N 13/04 | (2006.01) |
| H04N 5/232 | (2006.01) |
| H04N 5/247 | (2006.01) |
| G03B 15/06 | (2006.01) |
| G03B 35/08 | (2006.01) |
| H04N 7/00 | (2011.01) |

(52) U.S. Cl.
CPC .......... *H04N 5/2259* (2013.01); *G03B 15/06* (2013.01); *G03B 35/08* (2013.01); *G03B 37/04* (2013.01); *H04N 5/23238* (2013.01); *H04N 5/247* (2013.01); *H04N 13/0242* (2013.01); *H04N 13/0402* (2013.01); *H04N 13/0447* (2013.01); *H04N 2213/001* (2013.01)

(58) Field of Classification Search
CPC .. H04N 5/2259; H04N 5/247; H04N 5/23238; H04N 13/0242; H04N 13/0447; H04N 13/0402; H04N 2213/001; G03B 15/06; G03B 35/08; G03B 37/04
See application file for complete search history.

(56) References Cited

U.S. PATENT DOCUMENTS

| | | | |
|---|---|---|---|
| 8,810,627 B1 * | 8/2014 | Cho ...................... | H04N 5/2258 348/38 |
| 2005/0040962 A1 * | 2/2005 | Funkhouser .......... | G06F 1/1601 340/815.4 |
| 2010/0072379 A1 * | 3/2010 | Nishino ................ | G01T 1/2018 250/363.08 |
| 2011/0050929 A1 | 3/2011 | Lee et al. | |
| 2011/0261013 A1 * | 10/2011 | Lin ....................... | G06F 3/0428 345/175 |
| 2011/0296357 A1 * | 12/2011 | Kim ...................... | G06F 3/017 715/863 |

(Continued)

Primary Examiner — Sathyanaraya V Perungavoor
Assistant Examiner — Howard D Brown, Jr.

(57) ABSTRACT

Disclosed are an apparatus and a method to capture an image in an electronic device. The method includes capturing images focused on an object by a camera module mounted on a flexible display configured to bend in a direction of the object. The method also includes synthesizing the captured images and processing the synthesized image into an image of a set type.

17 Claims, 36 Drawing Sheets

(56) References Cited

U.S. PATENT DOCUMENTS

| | | | |
|---|---|---|---|
| 2012/0127272 A1* | 5/2012 | Lai | G03B 35/10 348/46 |
| 2012/0256720 A1* | 10/2012 | Byun | H01C 10/10 338/2 |
| 2013/0127785 A1* | 5/2013 | Wang | G06F 3/042 345/175 |
| 2013/0300682 A1* | 11/2013 | Choi | H04M 1/0268 345/173 |
| 2014/0028546 A1* | 1/2014 | Jeon | G06F 3/014 345/156 |
| 2014/0157206 A1* | 6/2014 | Ovsiannikov | G06F 3/0485 715/849 |
| 2015/0121287 A1* | 4/2015 | Fermon | G06F 3/016 715/773 |
| 2016/0014403 A1* | 1/2016 | Stroetmann | G06F 1/1641 348/53 |
| 2016/0202758 A1* | 7/2016 | Peana | G06F 3/013 345/601 |
| 2016/0242635 A1* | 8/2016 | Inoue | G02B 23/2484 |

* cited by examiner

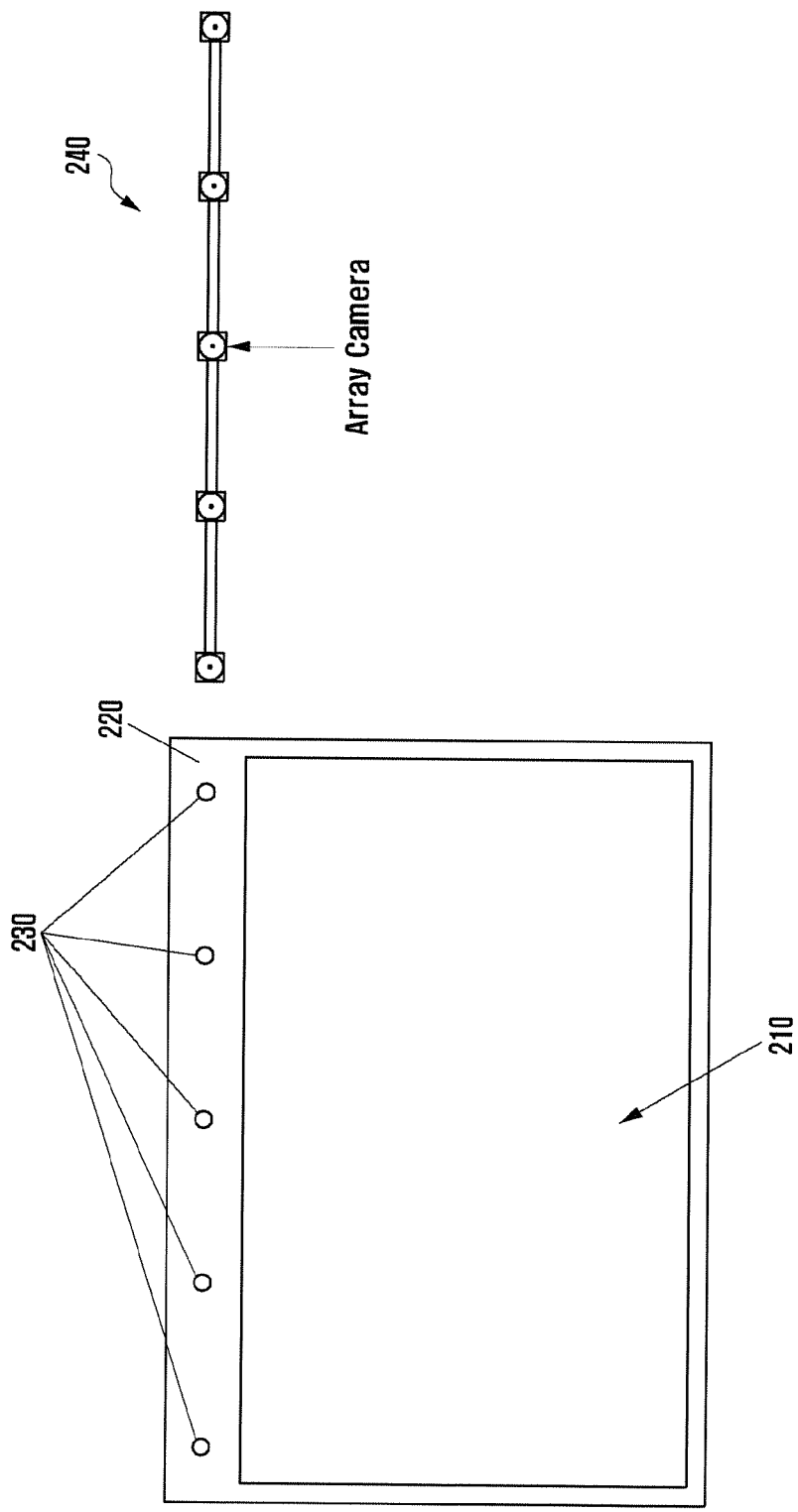

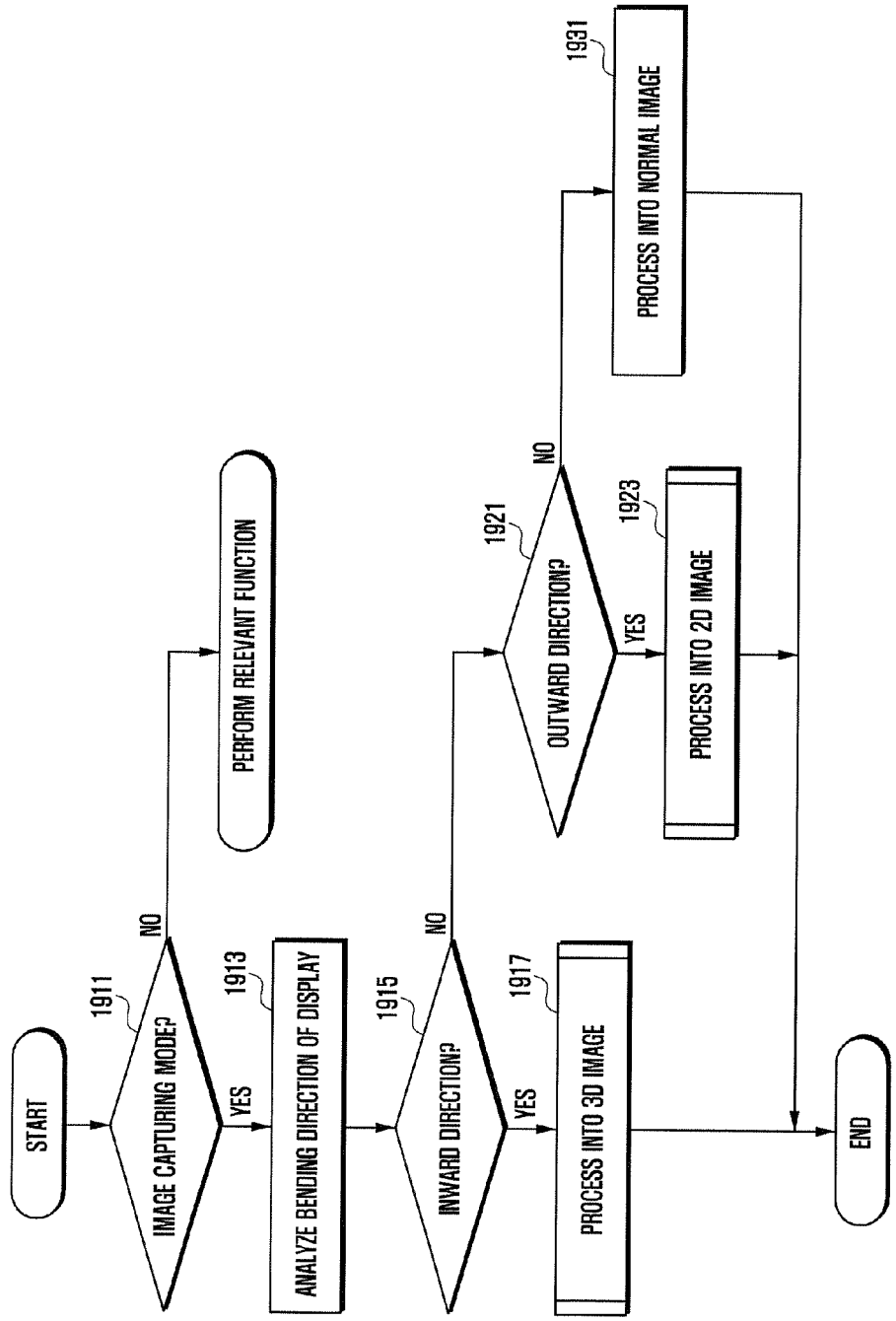

APPARATUS AND METHOD FOR CAPTURING IMAGE IN ELECTRONIC DEVICE

CROSS-REFERENCE TO RELATED APPLICATION(S) AND CLAIM OF PRIORITY

The present application is related to and claims priority from and the benefit under 35 U.S.C. § 119(a) of Korean Patent Application No. 10-2014-0012017, filed on Feb. 3, 2014, which is hereby incorporated by reference for all purposes as if fully set forth herein.

TECHNICAL FIELD

Various embodiments of the present disclosure relate to an apparatus and a method which, in an electronic device including a flexible display and multiple image sensors, process multiple images in various forms according to a bending direction of the electronic device.

BACKGROUND

When an image is captured in order to generate a panoramic image by using an electronic device, the panoramic image is generated in such a manner that images are acquired by operating a shutter switch multiple times while moving the electronic device and then the acquired images are post-processed. Also, the electronic device having a panoramic function uses a method for setting a panorama mode and continuously capturing images while moving the camera in a state of pressing a shutter switch. Further, a method for generating a three-dimensional (3D) image is such that one camera is used to image-capture an object in different directions multiple times and then a 3D image is generated by synthesizing the captured images.

SUMMARY

When an image is captured in order to generate a panoramic image or a 3D image by using the electronic device of the related art, images need to be captured by operating the shutter switch multiple times or need to be captured while moving the electronic device in a state of pressing the shutter switch. Accordingly, the image capturing method of the related art is inconvenient because it takes a long time to capture an image and the number of times of image-capturing is large.

To address the above-discussed deficiencies, it is a primary object to provide an apparatus and a method which, in an electronic device wherein an array camera is disposed in a line and is mounted on a flexible display, acquire and process multiple images through one-time image-capturing when the electronic device is bent in a direction of an object. At this time, the electronic device is bent inward and captures an image of an object surrounded by the electronic device, and generates content, such as a 3D image, video, and the like. In contrast, the electronic device is bent outward, and generates content, such as an image, video, and the like around the electronic device.

In a first example, a method for capturing an image in an electronic device is provided. The method includes capturing images focused on an object by a camera module mounted on a flexible display capable of being bent in a direction of the object. The method also includes synthesizing the captured images and processing the synthesized image into an image of a set type.

In a second example, a method for capturing an image in an electronic device is provided. The method includes measuring a brightness around an object by a camera module mounted on a flexible display capable of being bent in a direction of the object. The method also includes adjusting a brightness of the object by controlling a screen brightness of the flexible display according to the measured brightness. The method further includes capturing at least two images focused on the object by driving the camera module. The method includes synthesizing the captured images and processing the synthesized image into a three-dimensional (3D) image.

In a third example, an electronic device is provided. The electronic device includes a flexible display comprising holes and configured to bend in a direction of an object. The electronic device also includes a camera module comprising an optical unit located on a bottom of each of the holes of the flexible display and image sensors configured to capture images of the object. The electronic device includes an image processing unit configured to synthesize the images, which are output from the camera module, and process the synthesized images into one or more images of a set type.

According to various embodiments of the present disclosure, the electronic device includes the array camera (such as an array of cameras) and the flexible display. The method to process an image in the electronic device simultaneously acquires multiple images and generates content, such as a 3D moving image, and the like. Also, the electronic device analyzes a bending direction thereof, and processes the acquired images into one image and then converts the processed image into a 3D image when the electronic device is bent inward. In contrast when the electronic device is bent outward, the electronic device processes the acquired images into one two-dimensional (2D) image.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 is a view illustrating an example of mounting an array camera on an electronic device according to this disclosure;

FIG. 19 is a flowchart illustrating an example method for capturing an image in an electronic device including a flexible display and an array camera according to this disclosure;

DETAILED DESCRIPTION

Figure 1:
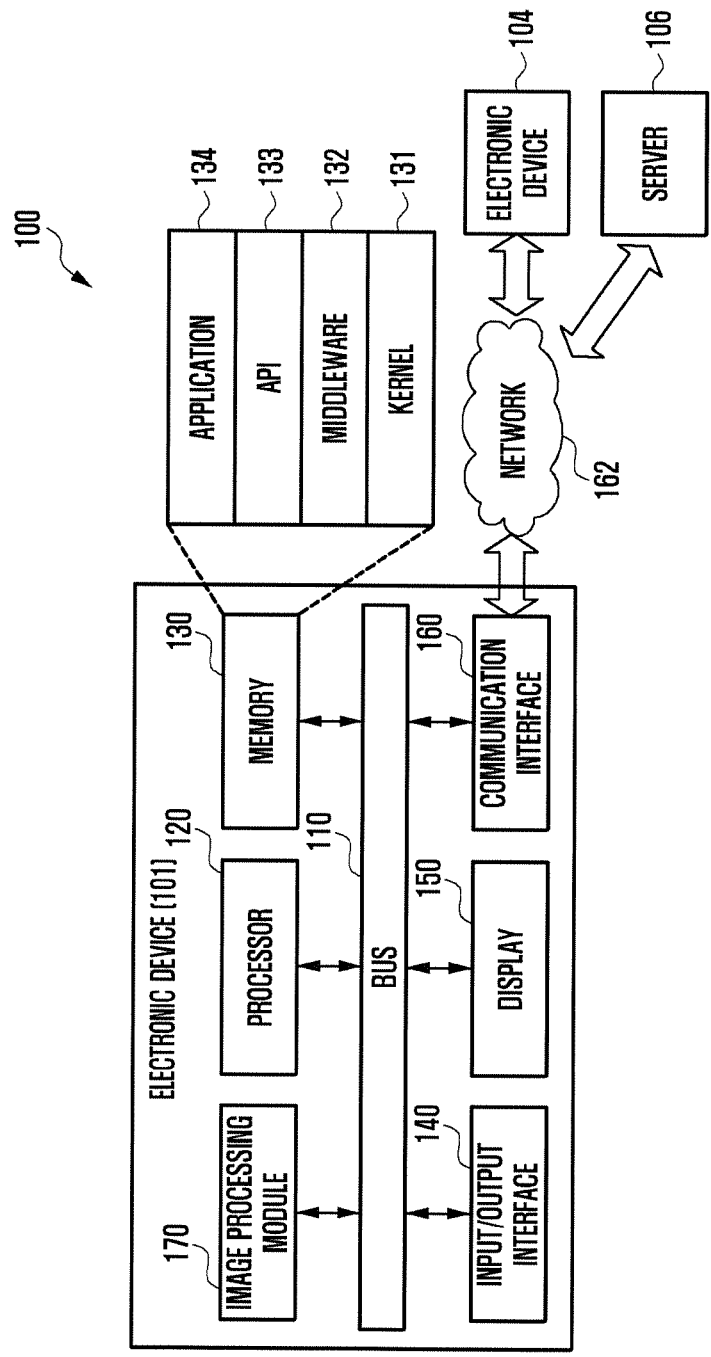
FIG. 1 is a view illustrating an example network environment including an electronic device according to this disclosure.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, embodiments of the present disclosure will be described in detail with reference to the accompanying drawings. It will be easily appreciated to those skilled in the art that various modifications, additions and substitutions are possible from the embodiment of the present disclosure, and the scope of the disclosure should not be limited to the following embodiments. The embodiments of the present disclosure are provided such that those skilled in the art completely understand the disclosure. In the drawings, the same or similar elements are denoted by the same reference numerals even though they are depicted in different drawings.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of the addition of one or more other characteristics, numbers, steps, operations, constituent elements, components or combinations thereof.

In the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., and/or the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although for both of them the first user device and the second user device are user devices. For example, a first element could be termed a second element, and similarly, a second element could be also termed a first element without departing from the scope of the present disclosure.

In the case where according to which a component is referred to as being "connected" or "accessed" to other component, it should be understood that not only the component is directly connected or accessed to the other component, but also another component may exist between the component and the other component. Meanwhile, in the case where according to which a component is referred to as being "directly connected" or "directly accessed" to other component, it should be understood that there is no component therebetween.

The terms used in the present disclosure are only used to describe specific various embodiments, and are not intended to limit the present disclosure. Singular forms are intended to include plural forms unless the context clearly indicates otherwise.

Unless otherwise defined, all terms including technical and/or scientific terms used herein have the same meaning as commonly understood by one of ordinary skill in the art to which the disclosure pertains. In addition, unless otherwise defined, all terms defined in generally used dictionaries may not be overly interpreted.

For example, the electronic device corresponds to a combination of at least one of the followings: a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player (such as an MP3 player), a mobile medical device, a camera, or a wearable device. Examples of the wearable device are a head-mounted-device (HMD) (such as electronic eyeglasses), electronic clothing, an electronic bracelet, an electronic necklace, an appcessory, an electronic tattoo, a smart watch, or the like.

The electronic device according to the embodiments of the present disclosure includes smart home appliances. Examples of the smart home appliances are a television (TV), a Digital Video Disk (DVD) player, an audio system, a refrigerator, an air-conditioner, a cleaning device, an oven, a microwave oven, a washing machine, an air cleaner, a set-top box, a TV box (such as Samsung HomeSync™, Apple TV™, or Google TV™), a game console, an electronic dictionary, an electronic key, a camcorder, an electronic album, or the like.

The electronic device according to the embodiments of the present disclosure includes at least one of the following: medical devices (such as Magnetic Resonance Angiography (MRA), Magnetic Resonance Imaging (MRI), Computed Tomography (CT), a scanning machine, an ultrasonic scanning device, or the like), a navigation device, a Global Positioning System (GPS) receiver, an Event Data Recorder (EDR), a Flight Data Recorder (FDR), a vehicle infotainment device, an electronic equipment for ships (such as navigation equipment, gyrocompass, or the like), avionics, a security device, a head unit for vehicles, an industrial or home robot, an automatic teller's machine (ATM), a point of sales (POS) system, or the like.

The electronic device according to the embodiments of the present disclosure include at least one of the following: furniture or a portion of a building or structure, an electronic board, an electronic signature receiving device, a projector, various measuring instruments (such as a water meter, an electric meter, a gas meter and a wave meter), or the like respectively. The electronic device according to the embodiments of the present disclosure also includes a combination of the devices listed above. In addition, the electronic device according to the embodiments of the present disclosure is a flexible device. It is obvious to those skilled in the art that the electronic device according to the embodiments of the present disclosure is not limited to the aforementioned devices.

Hereinafter, electronic devices according the embodiments of the present disclosure are described in detail with reference to the accompanying drawings. In the description, the term a 'user' is referred to as a person or a device that uses an electronic device, such as an artificial intelligent electronic device.

FIG. 1 is a view illustrating an example network environment 100 including an electronic device according to this disclosure. Referring to FIG. 1, the electronic device 101 includes a bus 110, a processor 120, a memory 130, an input/output (I/O) interface 140, a display 150, a communication interface 160 and an application control module 170.

The bus 110 is a communication circuit that connects the components to each other and transfers data (such as control messages) between the components. The processor 120 receives instructions from the components (such as the memory 130, input/output interface 140, display 150, communication interface 160, application control module 170, or the like) via the bus 110, decode them and perform corresponding operations or data processing according to the decoded instructions.

The memory 130 stores instructions or data transferred from or created in the processor 120 or the other components (such as the input/output interface 140, display 150, communication interface 160, application control module 170, or the like). The memory 130 includes programming modules, such as a kernel 131, middleware 132, application programming interface (API) 133, application module 134, or the like. Each of the programming modules can be software, firmware, hardware or a combination thereof.

The kernel 131 controls or manages system resources (such as the bus 110, processor 120, memory 130, or the like) used to execute operations or functions of the programming modules, such as the middleware 132, API 133, and application module 134. The kernel 131 also provides an interface that accesses and controls manages the components of the electronic device 101 via the middleware 132, API 133, and application module 134.

The middleware 132 makes it possible for the API 133 or application module 134 to perform data communication with the kernel 131. The middleware 132 also performs control operations (such as scheduling, load balancing) for task requests transmitted from the application module 134 by methods, for example, a method for assigning the order of priority to use the system resources (such as the bus 110, processor 120, memory 130, or the like) of the electronic device 101 to at least one of the applications of the application module 134.

The application programming interface (API) 133 is an interface that allows the application module 134 to control functions of the kernel 131 or middleware 132. For example, the API 133 include at least one interface or function (such as instruction) for file control, window control, character control, video process, or the like.

In embodiments of the present disclosure, the application module 134 includes applications that are related to: SMS/MMS, email, calendar, alarm, health care (such as an application for measuring the blood sugar level, a workout application, or the like), environment information (such as atmospheric pressure, humidity, temperature, or the like), and so on. The application module 134 is an application related to exchanging information between the electronic device 101 and the external electronic devices (such as an electronic device 104). The information exchange-related application includes a notification relay application for transmitting specific information to an external electronic device or a device management application for managing external electronic devices.

For example, the notification relay application includes a function for transmitting notification information, created by the other applications of the electronic device 101 (such as SMS/MMS application, email application, health care application, environment information application, or the like), to an external electronic device (such as electronic device 104). In addition, the notification relay application receives notification information from an external electronic device (such as electronic device 104) and provides it to the user. The device management application manages (such as to install, delete, or update): part of the functions of an external electronic device (such as electronic device 104) communicating with the electronic device 101, such as turning on/off the external electronic device, turning on/off part of the components of the external electronic device, adjusting the brightness (or the display resolution) of the display of the external electronic device, or the like; applications operated in the external electronic device; or services from the external electronic device, such as call service or messaging service, or the like.

In embodiments of the present disclosure, the application module 134 includes applications designated according to attributes (such as type of electronic device) of the external electronic device (such as electronic device 104). For example, if the external electronic device is an MP3 player, the application module 134 includes an application related to music playback. If the external electronic device is a mobile medical device, the application module 134 includes an application related to health care. In an embodiment of the present disclosure, the application module 134 includes at least one of the following: an application designated in the electronic device 101 and applications transmitted from external electronic devices (such as server 106, electronic device 104, or the like).

The input/output interface 140 receives instructions or data from the user via an input/output system (such as a sensor, keyboard or touch screen) and transfers them to the processor 120, memory 130, communication interface 160 or application control module 170 through the bus 110. For example, the input/output interface 140 provides data corresponding to a user's touch input to a touch screen to the processor 120. The input/output interface 140 receives instructions or data from the processor 120, memory 130, communication interface 160 or application control module 170 through the bus 110, and output them to an input/output system (such as a speaker or a display). For example, the input/output interface 140 outputs voice data processed by the processor 120 to the speaker.

The sensor includes an image sensor. According to various embodiments of the present disclosure, the image sensor is mounted to a camera module. Cameras of the camera module are disposed so as to be spaced from each other by a predetermined distance in the electronic device, and each camera includes an optical unit and an image sensor. Also, when an image is captured, the camera module captures multiple images by using the corresponding image sensors, respectively.

The display 150 displays information (such as multimedia data, text data, or the like) on the screen so that the user views it. The communication interface 160 communicates between the electronic device 101 and an external system (such as an electronic device 104 or server 106). For example, the communication interface 160 connects to a network 162 in wireless or wired mode and communicate with the external system. Wireless communication includes at least one of the following: Wireless Fidelity (Wi-Fi), Bluetooth (BT), near field communication (NFC), global positioning system (GPS) or cellular communication (such as LTE, LTE-A, CDMA, WCDMA, UMTS, Wi-Bro, GSM, or the like). Wired communication includes at least one of the following: universal serial bus (USB), high definition multimedia interface (HDMI), recommended standard 232 (RS-232), plain old telephone service (POTS), or the like In an embodiment of the present disclosure, the network 162 is a telecommunication network. The telecommunication network includes at least one of the following: a computer network, Internet, Internet of things, telephone network, or the like. The protocol for communication between the electronic device 101 and the external system, such as transport layer protocol, data link layer protocol, or physical layer protocol, is supported by at least one of the following: application module 134, API 133, middleware 132, kernel 131 and communication module 160.

The application control module 170 processes at least a part of the information acquired from other components (such as processor 120, memory 130, input/output interface 140, and communication interface 160) and provides the user with the processing result in various ways. For example, the application control module 170 controls a part of the functions of the electronic device 101 in order for the electronic device 101 to interoperate with other electronic device (such as electronic device 104 and server 106). According to an embodiment, at least a part of the application control module 170 is included in the server 106 such that at least one of the operations of the application control module 170 is supported by the server 106. In the electronic device according to various embodiments of the present disclosure, the application control module 170 is an image processing control module. Hereinafter, the application control module will be described as the image processing control module 170.

The image processing control module 170 drives an array camera and captures multiple images when an image is captured, synthesizes, into one image, the images captured in a bending (or rolling) direction of a flexible display, and then processes the synthesized images into a 2D image or a 3D image. For example, when a bending direction of the electronic device is inward, the image processing control module 170 processes the captured images into one image, and then generates a 3D image. In contrast, when the bending direction of the electronic device is outward, the image processing control module 170 processes the captured images into one image, and then generates a 2D image.

The electronic device, according to various embodiments of the present disclosure, is a flexible device. For example, a display of the electronic device is a display having a bending and/or rolling characteristic, and thus the electronic device also has the bending and/or rolling characteristic. The electronic device is a flexible device having two or more cameras, which face an identical surface, mounted thereon, and the electronic device is located (such as bent and/or rolled) so as to face an object intended to be captured. Then, the electronic device controls the two or more cameras to capture respective images, synthesizes the captured images into one image, and processes the synthesized image into a 2D image or a 3D image.

The two or more cameras facing an identical surface are arranged in a line, or are arranged in the faun of a predetermined pattern. Each of the two or more cameras includes a single camera, an array camera module, or a wide-angle camera capable of capturing an object located at a short focal length.

Also, after the flexible device is located in the shape of a closed curve on the periphery of the object and simultaneously captures images, the flexible device generates a 3D image by synthesizing the captured images into one image. For example, the flexible device performs panoramic image-capturing in a state of being located in the shape of a closed curve or an open curve (such as a circle) on the periphery of the object, and generates a 3D image from images obtained by the panoramic image-capturing.

When the electronic device is located on the periphery of the object, illumination is blocked by the flexible device. When capturing an image, the electronic device according to various embodiments of the present disclosure measures a brightness around an internal object through a camera, analyzes the measured brightness, and determines whether the measured brightness is enough to capture an image. When it is determined that the measured brightness is not enough to capture an image, the electronic device operates an illumination sensor or a display and provides the brightness necessary to capture an image.

When adjusting the internal brightness around the object, the electronic device activates an entire area or a partial area of the display. For example, when driving the display in order to adjust the brightness around the object, the electronic device divides the area of the display into multiple sub-areas, and then sequentially activates the corresponding sub-area of the display in order of image-capturing by a camera.

When the flexible device is bent in the shape of a circle in order to capture an image of the object, the electronic device, according to various embodiments of the present disclosure, deactivates a camera located in an area where the flexible device is bent and thus a part of the flexible device overlaps another part thereof.

FIG. 2 is a view illustrating an example of mounting an array camera on an electronic device according to this disclosure. Referring to FIG. 2, a display 210 of the electronic device is a flexible display. In the display 210, array camera holes 230 are formed in a bezel 220 to enable the array camera indicated by reference numeral 240 to be mounted on the bezel 220. The array camera 240 is mounted on the bottoms of the array camera holes 230. Also, the array camera 240 has a structure in which the cameras thereof are connected to each other, and each camera of the array camera 240 includes an optical unit (such as an optical lens) for performing a focusing function, and an image sensor for sensing an object image.

As illustrated in FIG. 2, the electronic device includes the display 210 having a bending and/or rolling characteristic and the array camera 240. The electronic device is a flexible device, and the display 210 is also bent in the bending direction of the electronic device. Also, the array camera 240 has a structure in which at least two cameras are disposed in a line and are connected to each other. Further, the array camera 240 is mounted on a lateral surface of the display 210. Hereinafter, a description will be made of a case in which the display 210 is a transparent display, but embodiments of the present disclosure are similarly applied to a case in which the display 210 is an opaque display.

The electronic device, according to various embodiments of the present disclosure, performs not only typical image-capturing using a camera, but also captures and processes an image by using the characteristics of the flexible display. When the electronic device is bent in an inward or outward direction, the display also is bent in the same direction, and the array camera is arranged in the bending direction of the electronic device. For example, when the electronic device is bent in the inward direction, the array camera is arranged in the direction of an object and captures an image of the object surrounded by the electronic device, and thus the electronic device generates content, such as a 3D image, video, and the like. In contrast, when the electronic device is bent in the outward direction, the electronic device generates content, such as 360-degree images around the electronic device, video, and the like.

Figure 3A:
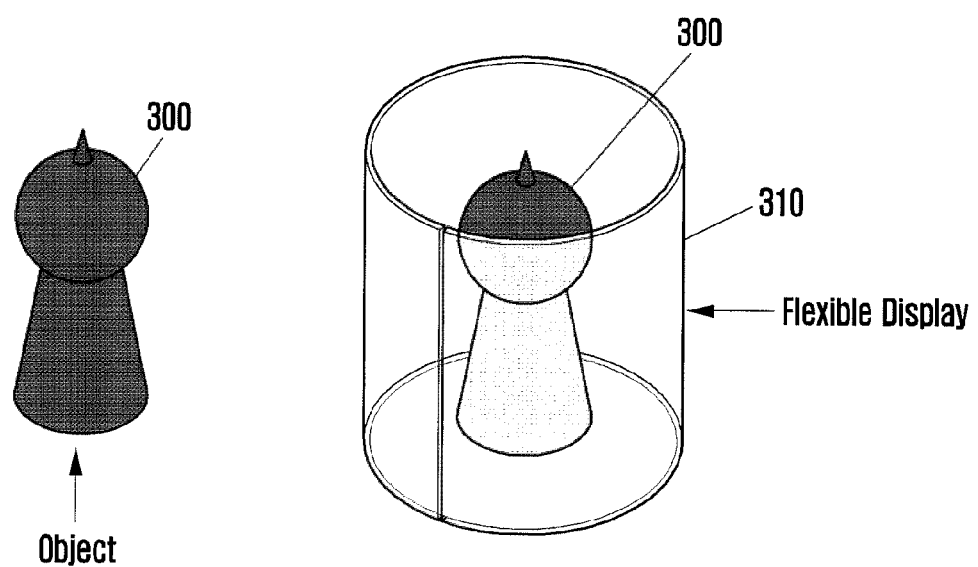
FIGS. 3A, 3B, and 3C are views of an example of capturing an image by using an electronic device including an array camera and a flexible display according to this disclosure.
Figure 3B:
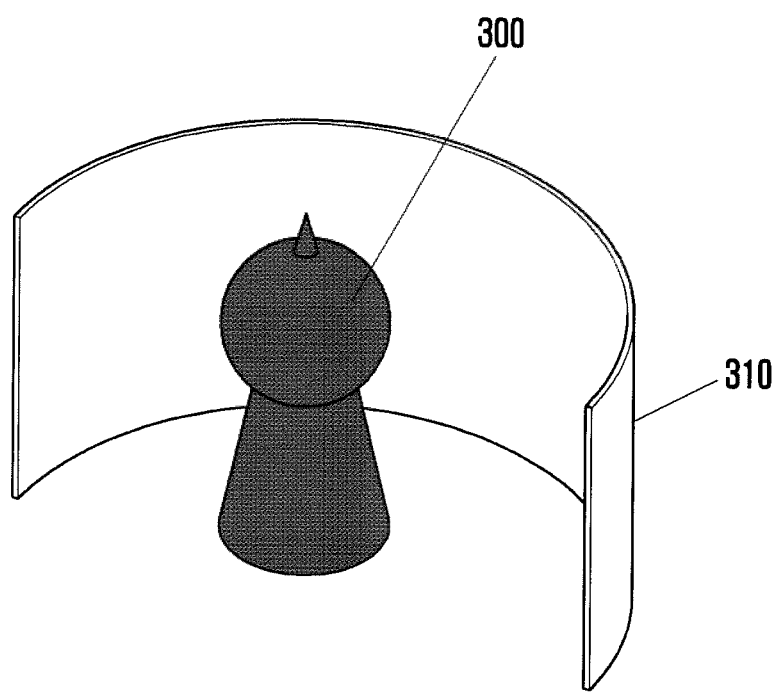
Figure 3C:
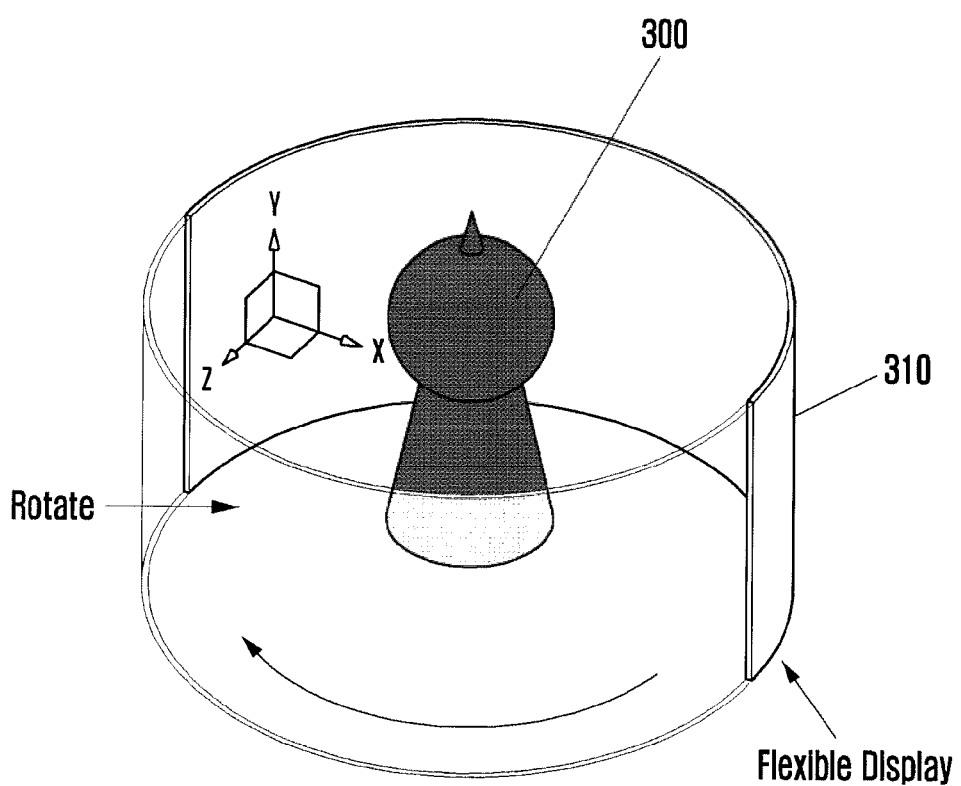

FIGS. 3A, 3B, and 3C are views of an example of capturing an image by using an electronic device including an array camera and a flexible display according to this disclosure. Referring to FIG. 3A, a 3D shaped object to be image-captured by using the flexible display 310 having the array camera mounted thereon is located, and the flexible display 310 is located in a direction of the object 300. For example, the flexible display 310 is rolled in the shape of a circle and is placed on the periphery of the object 300, with the object 300 as the center. Then, images of different surfaces of the object 300 are acquired by driving the array camera mounted on the flexible display 310. For example, in a state where the flexible display 310 surrounds the object 300 by 360 degrees as illustrated in FIG. 3A, images corresponding to respective directions are acquired by the cameras corresponding to the respective directions. After the multiple acquired images are synthesized, the synthesized image is processed into a 3D image.

Referring to FIGS. 3B and 3C, when an image of the object 300 is captured, a focal length is adjusted according to the size of the object 300 and/or that of the flexible display 310. FIGS. 3B and 3C illustrate an example of capturing an image of the object when the size of the object 300 is large or that of the flexible display 310 is small. For example, when the flexible display 310 has a size enough to be capable of surrounding the object 300 by 180 degrees, as illustrated in FIG. 3B, the object 300 is located in the center of the flexible display 310, and the flexible display 310 is rolled in the shape of an arc and is located on the periphery of the object 300. Then, an image of the object 300 is captured in a state of locating the object 300 and the flexible display 310 as illustrated in FIG. 3A. Next, the flexible display 310 is rotated by 180 degrees as illustrated in FIG. 3C, and then captures an image of the object 300. Thereafter, the electronic device synthesizes the images, which have been captured twice, and then processes the synthesized image into a 2D image or a 3D image. In another method, an image of the object 300 is captured while the object 300 is rotated. For example, after the object 300 and the flexible display 310 are located as illustrated in FIG. 3B and an image of the object 300 is captured, the object 300 is rotated by 180 degrees and an image of the object 300 is captured. In the example of another method, the same effect is obtained. Here, the display of the electronic device includes a display having a bending and/or rolling characteristic, and thus bending of the flexible display 310 signifies bending of the electronic device. Accordingly, the bending of the flexible display 310 has the same meaning as that of the electronic device.

Figure 4:
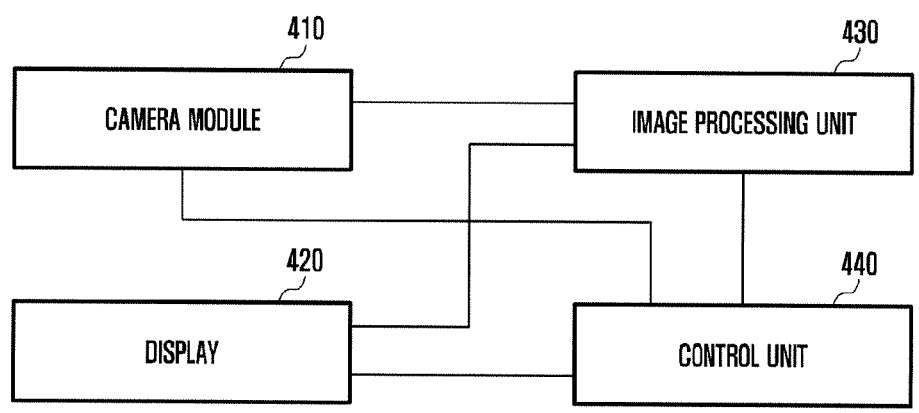
FIG. 4 is a view of an example operation of an image processing control module according to this disclosure.

FIG. 4 is a view of an example operation of an image processing control module according to this disclosure. The image processing apparatus according to various embodiments of the present disclosure includes a camera module 410, a display 420, an image processing unit 430 and a control unit 440, or is implemented by close operations of the camera module 410, the display 420, the image processing unit 430 and the control unit 440.

Referring to FIG. 4, the camera module 410 and the display 420 have the configuration illustrated in FIG. 2. The camera module 410 has a configuration of the array camera in which multiple cameras are spaced from each other by a set distance and are connected to each other, and each of the multiple cameras includes an optical unit and an image sensor. The display 420 is a flexible display. As the electronic device is bent, the display 420 is also bent in a direction identical to a bending direction of the electronic device. The display 420 includes a bezel area, in which holes capable of exposing the cameras of the camera module 410 to the outside is formed, and the cameras of the camera module 410 is mounted on the bottoms of the respective holes.

The control unit 440 drives the camera module 410 in response to an image-capturing request signal, and senses the bending direction of the display 420. The image processing unit 430 receives, as input, a bending direction signal of the display 420 which is output from the control unit 440, and receives, as input, images which are output from the camera module 410. The image processing unit 430 processes the received images, synthesizes the processed images into one image, and then generates a 2D image or a 3D image from the synthesized image. When the bending direction signal is an inward bending signal, the image processing unit 430 generates a 3D image from the synthesized image. In contrast, when the bending direction signal is an outward bending signal, the image processing unit 430 processes the synthesized image into a 2D image. Here, the 2D image is a panoramic image.

According to an embodiment of the present disclosure, the image processing unit 430 and the control unit 440 are included in the image processing control module 170 illustrated in FIG. 1. Alternatively, the image processing unit 430 is the image processing control module 170 illustrated in FIG. 1, and the control unit 440 is the processor 120 illustrated in FIG. 1.

Figure 5:
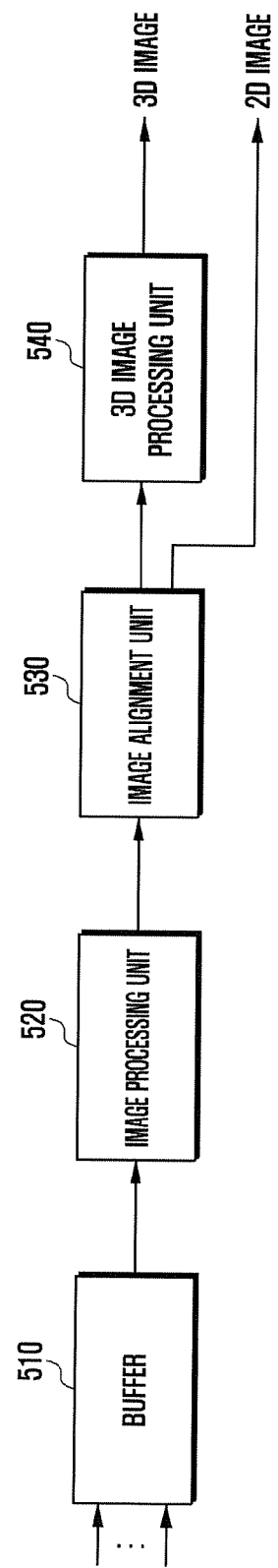
FIG. 5 is a block diagram illustrating an example configuration of an image processing control module according to this disclosure.

FIG. 5 is a block diagram illustrating an example configuration of an image processing control module according to this disclosure. Referring to FIG. 5, images acquired by the camera module 410 are at least two images. A buffer 510 buffers the images which are output from the camera module 410, and an image processing unit 520 image-processes the images buffered in the buffer 510. In a method for the image processing, image pre-processing and image post-processing is performed in such a manner as to be distinguished from each other. Examples of the image pre-processing includes 3A (Auto White Balance (AWB), Auto Exposure (AE), and Auto Focusing (AF)) extraction and processing, lens shading correction, dead pixel correction, and the like. Examples of the image post-processing include color interpolation, Image Processing Chain (IPC), color image conversion, and the like. Also, the image processing unit 520 includes a scaler. The scaler resizes an image to a set image size and/or performs decimation of the image. The image processing unit 520, according to an embodiment of the present disclosure, may not perform the scaling operation when processing a panoramic image.

An image alignment unit 530 synthesizes the images, which are processed by the image processing unit 520, into one image. The camera module 410 outputs multiple images, and the multiple images include images which overlap due to a view angle of the camera module 410. Accordingly, when the multiple images including the overlapping images are synthesized, the multiple images are synthesized into one image as images having an overlapping area are removed. A method for generating one image from the multiple images is performed by using a panoramic image generation method.

A 3D image processing unit 540 processes the 2D images synthesized by the image alignment unit 530 into a 3D image. A method for converting the 2D images into a 3D image is performed by using a depth map. A method for extracting depth information from the 2D images extracts depth information by using region segmentation information (which, in the case of a moving image, includes region segmentation and movement information) or by using an edge directional histogram. According to various embodiments of the present disclosure, the method for converting the 2D images into a 3D image is implemented by various methods.

Further, the 3D image processing unit 540 is driven in a state where the display 420 is bent in an inward direction. Specifically, the control unit 440 senses a bending direction of the display 420 through a sensor. When the display 420 is bent in the inward direction, the control unit 440 drives the 3D image processing unit 540, and controls the 3D image processing unit 540 to generate a 3D image from a 2D image. In contrast, when the display 420 is bent in an outward direction, the control unit 440 may not drive the 3D image processing unit 540. When the 3D image processing unit 540 is not driven, the control unit 440 controls the image alignment unit 530 to generate and output a 2D image. Here, the 2D image is an image obtained in such a manner that the camera module 410 performs panoramic image-capturing on objects placed in an outward direction of the electronic device.

Figure 6:
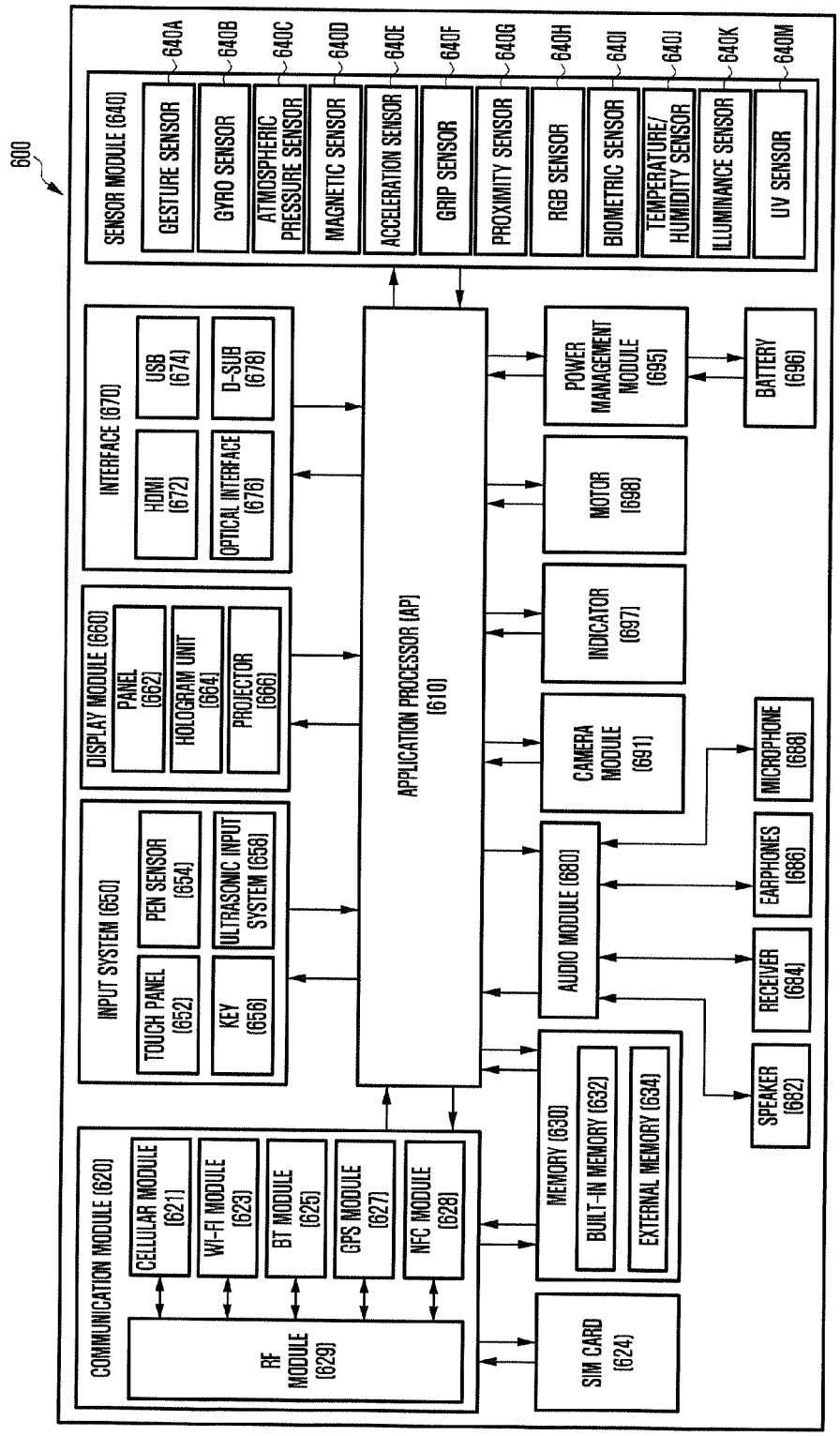
FIG. 6 is a block diagram illustrating an example configuration of an electronic device according to this disclosure.

FIG. 6 is a block diagram illustrating an example configuration of an electronic device 600 according to this disclosure. The electronic device 601 is of the whole or a part of the electronic device 101. Referring to FIG. 6, the electronic device 601 includes an Application Processor (AP) 610, a communication module 620, a Subscriber Identity Module (SIM) card 624, a memory 630, a sensor module 640, an input device 650, a display 660, an interface 670, an audio module 680, a camera module 691, a power management module 695, a battery 696, an indicator 697, and a motor 698.

The AP 610 operates an Operating System (OS) and/or application programs to control a plurality of hardware and/or software components connected to the AP 610 and perform data-processing and operations on multimedia data. For example, the AP 610 is implemented in the form of System on Chip (SoC). According to an embodiment, the AP 610 includes a Graphic Processing Unit (GPU).

The communication module 620 (such as communication interface 160) performs data communication with other electronic devices (such as electronic device 104 and server 106) through a network. According to an embodiment, the communication module 620 includes a cellular module 621, a Wi-Fi module 623, a BT module 625, a GPS module 627, an NFC module 628, and a Radio Frequency (RF) module 629.

The cellular module 621 is responsible for voice and video communication, text messaging, and Internet access services through a communication network (such as LTE, LTE-A, CDMA, WCDMA, UMTS, WiBro, and GSM networks). The cellular module 621 perform identifies and authenticates electronic devices in the communication network using the SIM card 624. According to an embodiment, the cellular module 621 performs at least one of the functions of the AP 610. For example, the cellular module 621 performs at least a part of the multimedia control function.

According to an embodiment, the cellular module 621 includes a Communication Processor (CP). The cellular module 621 is implemented in the faun of SOC. Although the cellular module 621 (such as a communication processor), the memory 630, and the power management module 695 are depicted as independent components separated from the AP 610, the present disclosure is not limited thereto but is embodied in a way that the AP includes at least one of the components (such as cellular module 621).

According to an embodiment, each of the AP 610 and the cellular module 621 (such as a communication processor) loads a command or data received from at least one of the components on a non-volatile or volatile memory and process the command or data. The AP 610 or the cellular module 621 stores the data received from other components or generated by at least one of other components in the non-volatile memory.

Each of the Wi-Fi module 623, the BT module 625, the GPS module 627, and the NFC module 628 includes a processor for processing the data it transmits or receives. Although the cellular module 621, the Wi-Fi module 623, the BT module 625, the GPS module 627, and the NFC module 628 are depicted as independent blocks; at least two of them (such as a communication processor corresponding to the cellular module 621 and Wi-Fi processor corresponding to the Wi-Fi module 623) is integrated in the form of SoC.

The RF module 629 is responsible for data communication, e.g. transmitting/receiving RF signals. Although not depicted, the RF module 629 includes a transceiver, a Power Amp Module (PAM), a frequency filter, and a Low Noise Amplifier (LNA). The RF module 629 also includes the elements for transmitting/receiving electric wave in free space, e.g. conductor or conductive wire. Although FIG. 6 is directed to the case where the Wi-Fi module 623, the BT module 625, the GPS module 627, and the NFC module 628 are sharing the RF module 629, the present disclosure is not limited thereto but is embodied in a way that at least one of the Wi-Fi module 623, the BT module 6e627, and the NFC module 628 transmits/receives RF signals an independent RF module.

The SIM card 624 is designed so as to be inserted into a slot formed at a predetermined position of the electronic device. The SIM card 624 stores unique identity information such as an Integrated Circuit Card Identifier (ICCID)) or subscriber information (e.g. International Mobile Subscriber Identity (IMSI)). The memory 630 (such as memory 130) includes at least one of the internal memory 632 and an external memory 634. The internal memory 632 include at least one of a volatile memory (such as a Dynamic Random Access Memory (DRAM), Static RAM (SRAM), Synchronous Dynamic RAM (SDRAM) or a non-volatile memory (such as a One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory).

According to an embodiment, the internal memory 632 is a Solid State Drive (SSD). The external memory 634 is a flash drive such as Compact Flash (CF), Secure Digital (SD), micro-SD, Mini-SD, extreme Digital (xD), and Memory Stick. The external memory 634 is connected to the electronic device 601 through various interfaces functionally. According to an embodiment, the electronic device 601 includes a storage device (or storage medium) such as hard drive.

The sensor module 640 measures physical quantity or checks the operation status of the electronic device 601 and converts the measured or checked information to an electric signal. The sensor module 640 includes at least one of gesture sensor 640A, Gyro sensor 640B, barometric sensor 640C, magnetic sensor 640D, acceleration sensor 640E, grip sensor 640F, proximity sensor 640G, color sensor 640H (such as a Red, Green, Blue (RGB) sensor), bio sensor 640I, temperature/humidity sensor 640J, illuminance sensor 640K, and Ultra Violet (UV) sensor 640M. Additionally or alternatively, the sensor module 640 includes E-nose sensor (not shown), Electromyography (EMG) sensor, Electroencephalogram (EEG) sensor, Electrocardiogram (ECG) sensor, Infrared (IR) sensor, iris sensor, and fingerprint sensor. The sensor module 640 further includes a control circuit for controlling at least one of the sensors included therein.

The input device 650 includes a touch panel 652, a (digital) pen sensor 654, keys 656, and an ultrasonic input device 658. The touch panel 652 comprises one of capacitive, resistive, infrared, or microwave type touch panel. The touch panel 652 includes a control circuit. In the case of the capacitive type touch panel, it is possible to detect physical contact or approximation. The touch panel 652 further includes a tactile layer. In this case, the touch panel 652 provides the user with haptic reaction.

The (digital) pen sensor 654 is implemented with a sheet with the same or similar way as touch input of the user or a separate recognition sheet. The keys 656 includes physical buttons, optical key, and keypad. The ultrasonic input device 658 is a device capable of checking data by detecting sound wave through a microphone 688 and is implemented for wireless recognition. According to an embodiment, the electronic device 601 receives the user input made by means of an external device (such as a computer or server) connected through the communication module 620.

The display 660 (such as display module 150) includes a panel 662, a hologram device 664, and a projector 666. The panel 662 is a Liquid Crystal Display (LCD) panel or an Active Matrix Organic Light Emitting Diodes (AMOLED) panel. The panel 662 is implemented so as to be flexible, transparent, and/or wearable. The panel 662 is implemented as a module integrated with the touch panel 652. The hologram device 664 presents a 3-dimensional image in the air using interference of light. The projector 666 projects an image to a screen. The screen is placed inside or outside the electronic device. According to an embodiment, the display 660 includes a control circuit for controlling the panel 662, the hologram device 664, and the projector 666.

The interface 670 includes a High-Definition Multimedia Interface (HDMI) 672, a Universal Serial Bus (USB) 674, an optical interface 676, and a D0subminiature (D-sub) 678. The interface 670 includes the communication interface 160 as shown in FIG. 1. Additionally or alternatively, the interface 670 includes a Mobile High-definition Link (MHL) interface, a SD/MMC card interface, and infrared Data Association (irDA) standard interface.

The audio module 680 converts sound to electric signal and vice versa. At least a part of the audio module 680 is included in the input/output interface 140 as shown in FIG. 1. The audio module 680 processes the audio information input or output through the speaker 682, the receiver 684, the earphone 686, and the microphone 688. The camera module 691 is a device capable of taking still and motion pictures and, according to an embodiment, includes at least one image sensor (such as front and rear sensors), a lens, and Image Signal Processor (ISP), and a flash (such as an LED or xenon lamp). The power management module 695 manages the power of the electronic device 601. Although not shown, the power management module 695 includes a Power Management Integrated Circuit (PMIC), a charger Integrated Circuit (IC), a battery, and a battery or fuel gauge.

The PMIC is integrated into an integrated circuit or SoC semiconductor. The charging is classified into wireless charging and wired charge. The charger IC charges the battery and protects the charger against overvoltage or overcurrent. According to an embodiment, the charger IC includes at least one of wired charger and wireless charger ICs. Examples of the wireless charging technology includes resonance wireless charging and electromagnetic wave wireless charging, and there is a need of extra circuit for wireless charging such as coil loop, resonance circuit, and diode.

The battery gauge measures the residual power of the battery 696, charging voltage, current, and temperature. The battery 696 stores or generates power and supplies the stored or generated power to the electronic device 601. The battery 696 includes a rechargeable battery or a solar battery.

The indicator 697 displays operation status of the electronic device 601 or a part of the electronic device, booting status, messaging status, and charging status. The motor 698 converts the electronic signal to mechanical vibration. The electronic device 601 can include a processing unit (such as a GPU) for supporting mobile TV. The processing unit for supporting the mobile TV is able to processing the media data abiding by the broadcast standards such Digital Multimedia Broadcasting (DMB), Digital Video Broadcasting (DVB), and media flow. The above enumerated components of the electronic device of the present disclosure is implemented into one or more parts, and the names of the corresponding components is changed depending on the kind of the electronic device. The electronic device of the present disclosure includes at least one of the aforementioned components with omission or addition of some components. The components of the electronic device of the present disclosure are combined selectively into an entity to perform the functions of the components equally as before the combination. The term "module" according to the embodiments of the disclosure, means, but is not limited to, a unit of one of software, hardware, and firmware or any combination thereof. The term "module" is used interchangeably with the terms "unit," "logic," "logical block," "component," or "circuit." The term "module" denotes a smallest unit of component or a part thereof. The term "module" is the smallest unit of performing at least one function or a part thereof. A module is implemented mechanically or electronically. For example, a module include at least one of Application-Specific Integrated Circuit (ASIC) chip, Field-Programmable Gate Arrays (FPGAs), and Programmable-Logic Device known or to be developed for certain operations.

The electronic device according to various embodiments of the present disclosure includes a flexible display having holes formed therein and capable of being bent in a direction of an object. A camera module including an optical unit disposed on the bottom of each hole of the flexible display and image sensors for acquiring images of the object. An image processing unit for synthesizing the images, which are output from the camera module, and processing the synthesized images into an image of a set type.

The camera module is an array of at least two cameras connected to each other, and the display includes the holes, in which the optical units of the cameras are disposed, in a bezel area of the display. When the display is bent in the direction of the object, the cameras of the camera module focus on the object located in the center of the display and capture multiple images. Then, the image processing unit synthesizes the multiple captured images into one image, and processes the synthesized image into a 3D image.

Also, the electronic device further includes a control unit for analyzing the bending direction of the display and controlling image processing. Under the control of the control unit, when the bending direction of the display is inward, the image processing unit synthesizes the acquired images into one image and processes the synthesized image into a 3D image. In contrast, when the bending direction of the display is outward, the image processing unit synthesizes the acquired images into one image and processes the synthesized image into a 2D image. The at least two cameras of the camera module face an identical surface, and are arranged in a line or in the form of a predetermined pattern.

Also, the electronic device further includes a control unit for measuring a brightness around the object and controlling a screen brightness of the display. When the display surrounds the object in the shape of a closed curve, the control unit dividedly drives the cameras of the camera module, and processes a part of a display area at a position, where a camera not driven is located, as a black screen. Alternatively, when the display surrounds the object in the shape of a closed curve, the control unit divides the display area of the display into partial display areas and drives some of the partial display areas, and performs a control operation for simultaneously driving the cameras of the camera module and acquiring images. Alternatively, when the display surrounds the object in the shape of a closed curve, the control unit sequentially drives the cameras of the camera module, and sequentially drives the parts of the display area of the display which respectively correspond to positions of the sequentially-driven cameras.

Figure 7:
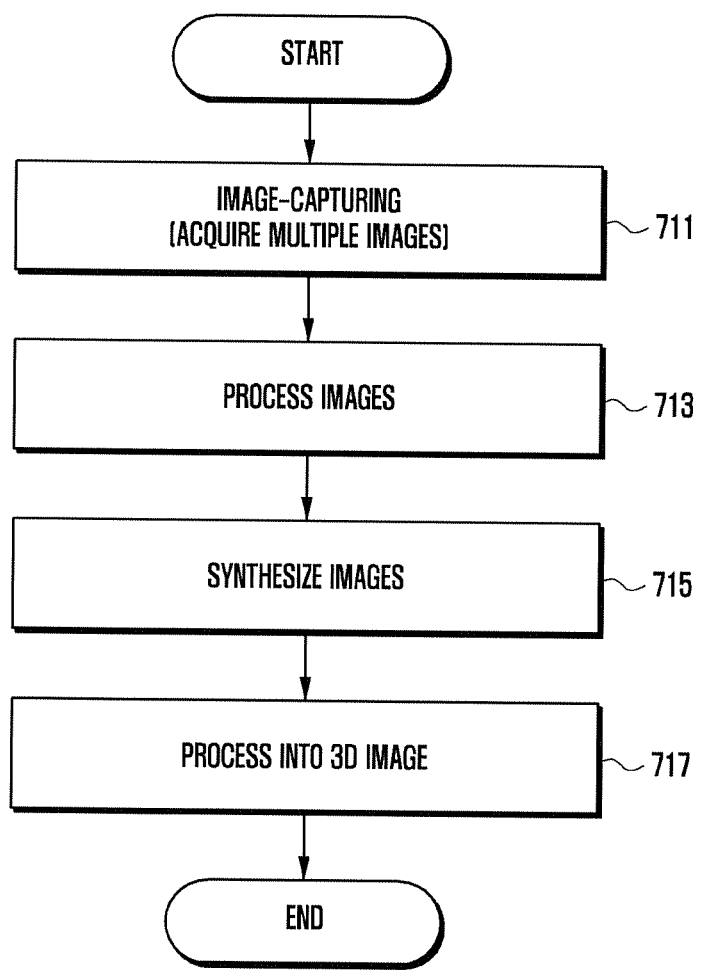
FIG. 7 is a flowchart illustrating an example method for capturing an image in an electronic device including an array camera and a flexible display according to this disclosure.

The display is a transparent display including a brightness adjustment bar, and the screen brightness of the display is adjusted by using the brightness adjustment bar. FIG. 7 is a flowchart illustrating an example method for capturing an image in an electronic device including an array camera and a flexible display according to this disclosure. Hereinafter, the method for capturing an image will be described with reference to FIG. 7. Referring to FIG. 7, when image-capturing is requested, the control unit 440 drives the camera module 410 and acquires an image of an object through the camera module 410. At this time, each of the cameras of the camera module 410 focus on an object according to a bent direction of the display 420 and capture an image of the object. Then, the captured images are provided to the image processing unit 430. When the camera module 410 is driven and captures the images in operation 711, in operation 713, the image processing unit 430 buffers the captured images, and pre-processes and post-processes the buffered images. In operation 715, the image processing unit 430 synthesizes the processed images into one image. In operation 717, the image processing unit 430 generates a 2D image or a 3D image from the synthesized image.

The control unit 440 sets an image type to be generated according to the bending direction of the display 420. For example, when the display 420 is bent in the inward direction, the camera module 410 focuses on an object located in the center of the display 420, and thus captures and acquires images of the one object. In contrast, when the display 420 is bent in the outward direction, the camera module 410 focuses on objects located on the periphery of the electronic device, and thus captures and acquires images of the objects located around the electronic device. Accordingly, when detecting that the display 420 is bent in the inward direction, the control unit 440 controls the image processing unit 430 to generate a 3D image. When detecting that the display 420 is bent in the outward direction, the control unit 440 controls the image processing unit 430 to generate a 2D image having a panoramic format.

Figure 8:
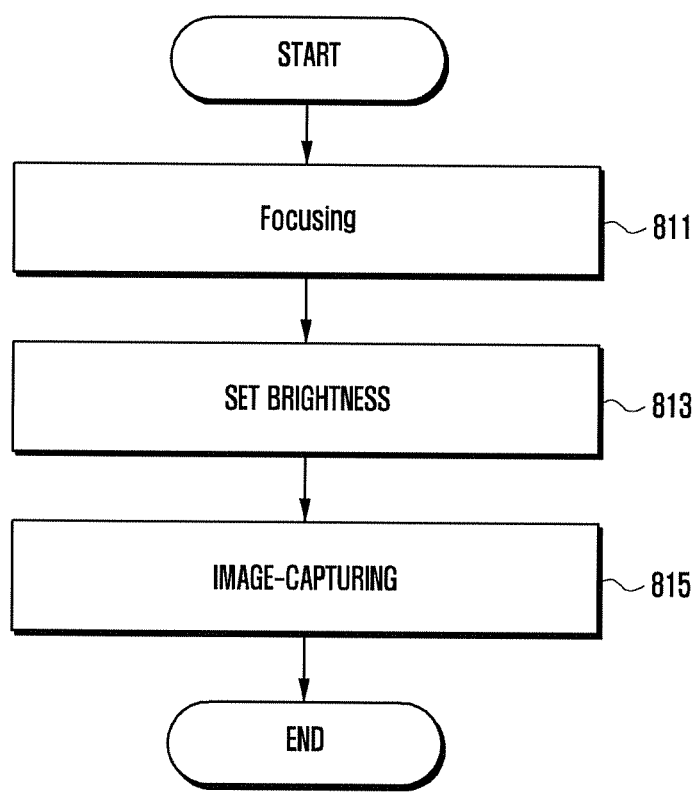
FIG. 8 is a flowchart illustrating an example method for capturing an image by a camera module including an array camera according to this disclosure.

FIG. 8 is a flowchart illustrating an example method for capturing an image by a camera module including an array camera according to this disclosure. Referring to FIG. 8, in operation 811, the cameras of the camera module focus on an object according to the bending direction of the display 420. For example, when the display 420 is bent in the inward direction, the cameras of the camera module 410 focus on objects located in the center of the display 420, and focus on the objects by using different focal points according to shapes of the objects. In contrast, when the display 420 is bent in the outward direction, the cameras of the camera module 410 focus on objects, which are located on the periphery of the display 420, according distances between the cameras and the objects. In operation 813, the control unit 440 analyzes a brightness around the object and adjusts the brightness so that the camera module 410 captures an image of the object. After the control unit 440 adjusts the brightness, in operation 815, the control unit 440 drives the camera module 410 and captures an image of the object. At this time, the control unit 440 drives the cameras of the camera module 410 simultaneously or sequentially, and captures images of the object through the cameras of the camera module 410.

When an image of the object is captured while the display 420 is bent in the inward direction, the electronic device is located in a state of locating the object in the center of the display 420, and thus illumination around the object is blocked by the electronic device. At this time, if illumination of the object is changed by the electronic device, the electronic device has difficulty in acquiring a desired image. Accordingly, the electronic device needs a separate illumination apparatus for capturing an image of the object.

Figure 9:
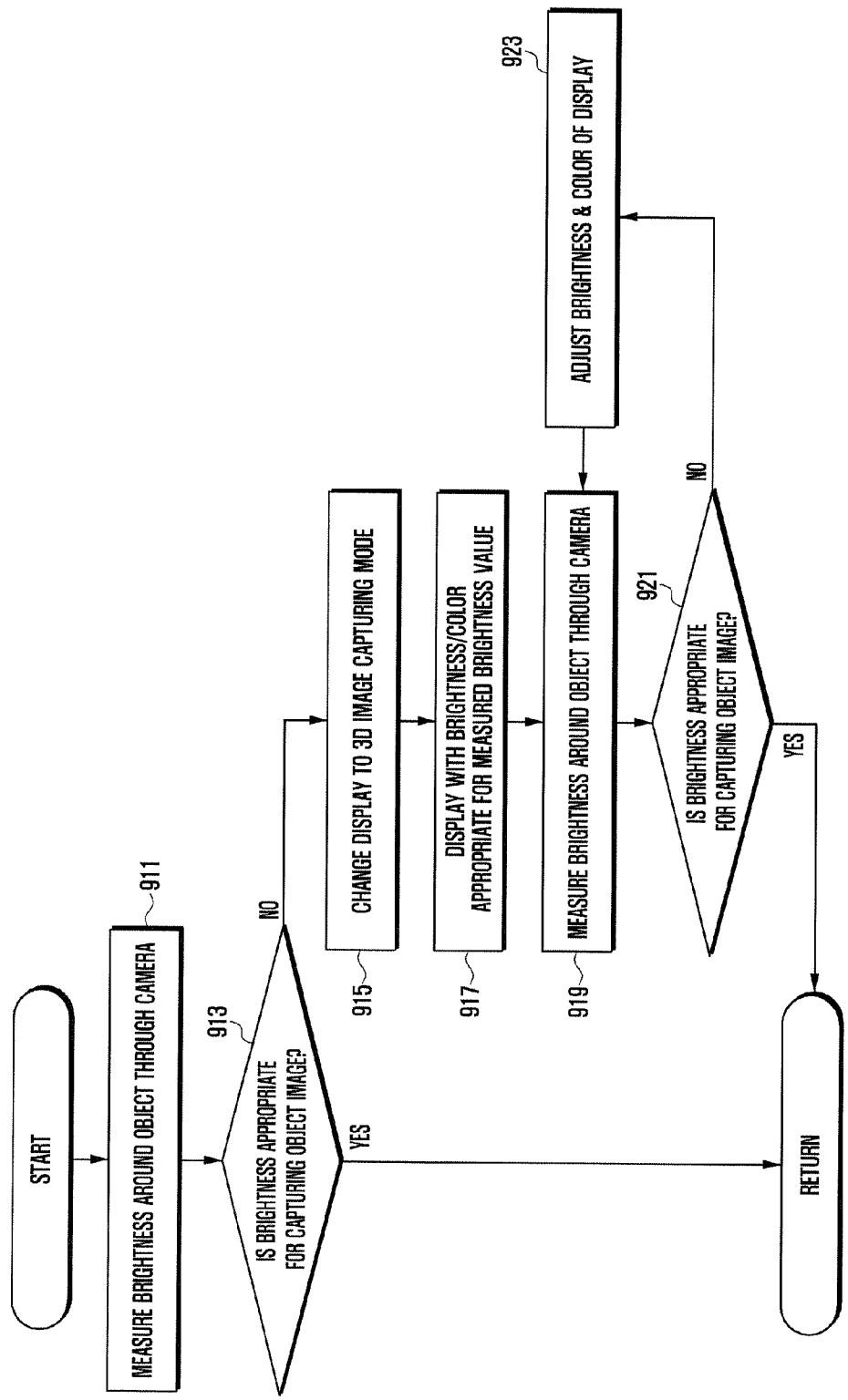
FIG. 9 is a flowchart illustrating an example method for analyzing a surrounding brightness and adjusting a brightness around an object in an electronic device according to this disclosure.
Figure 10A:
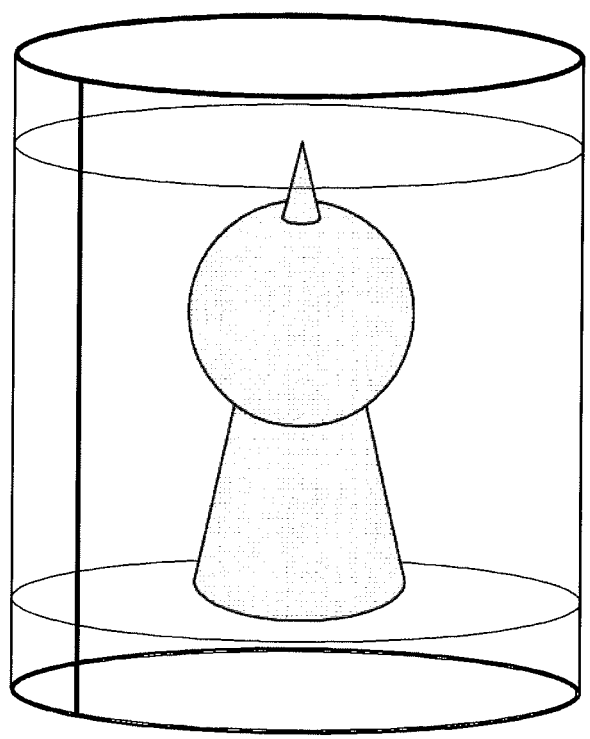
FIGS. 10A and 10B are example views of a brightness around an object when a flexible display is used as an illumination apparatus according to this disclosure.
Figure 10B:
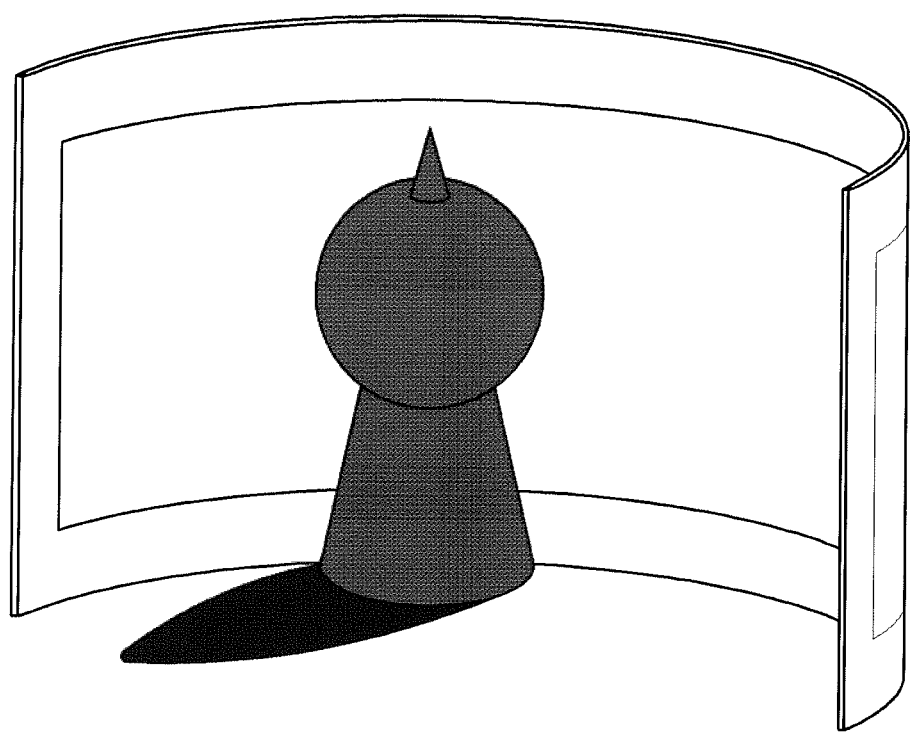
Figure 11A:
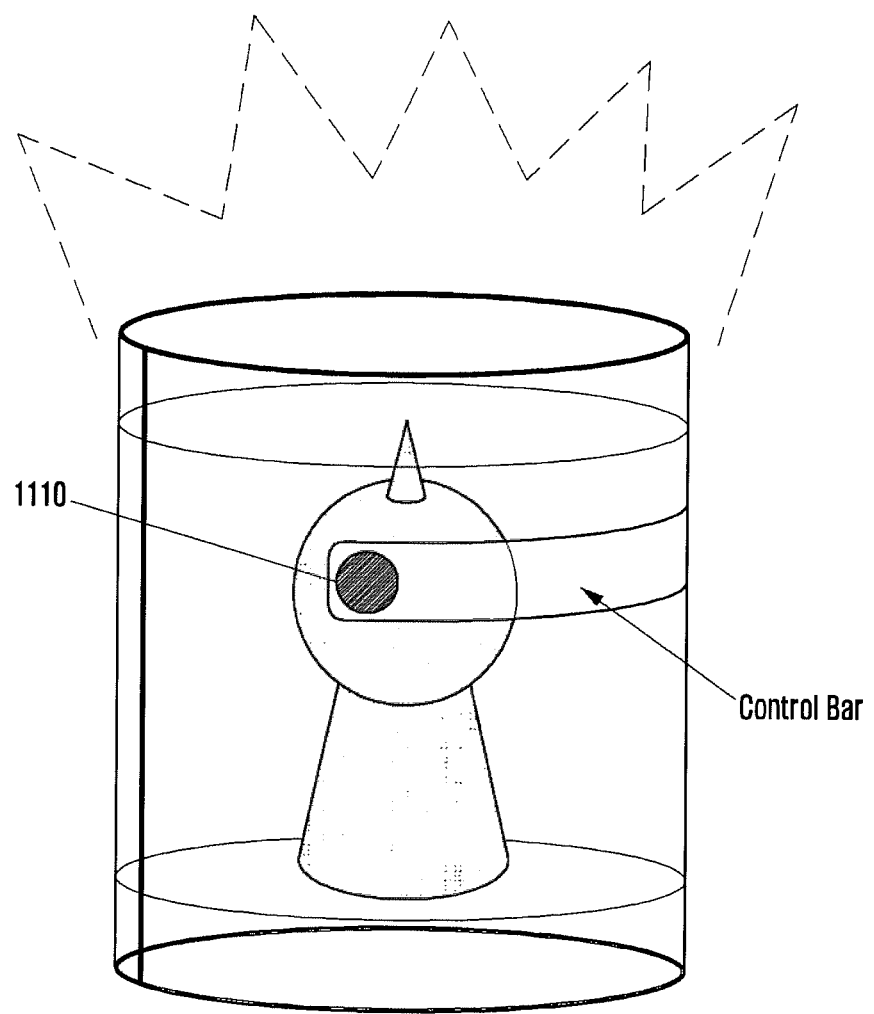
FIGS. 11A and 11B are views illustrating an example of adjusting a brightness around an object by using a flexible display according to this disclosure.
Figure 11B:
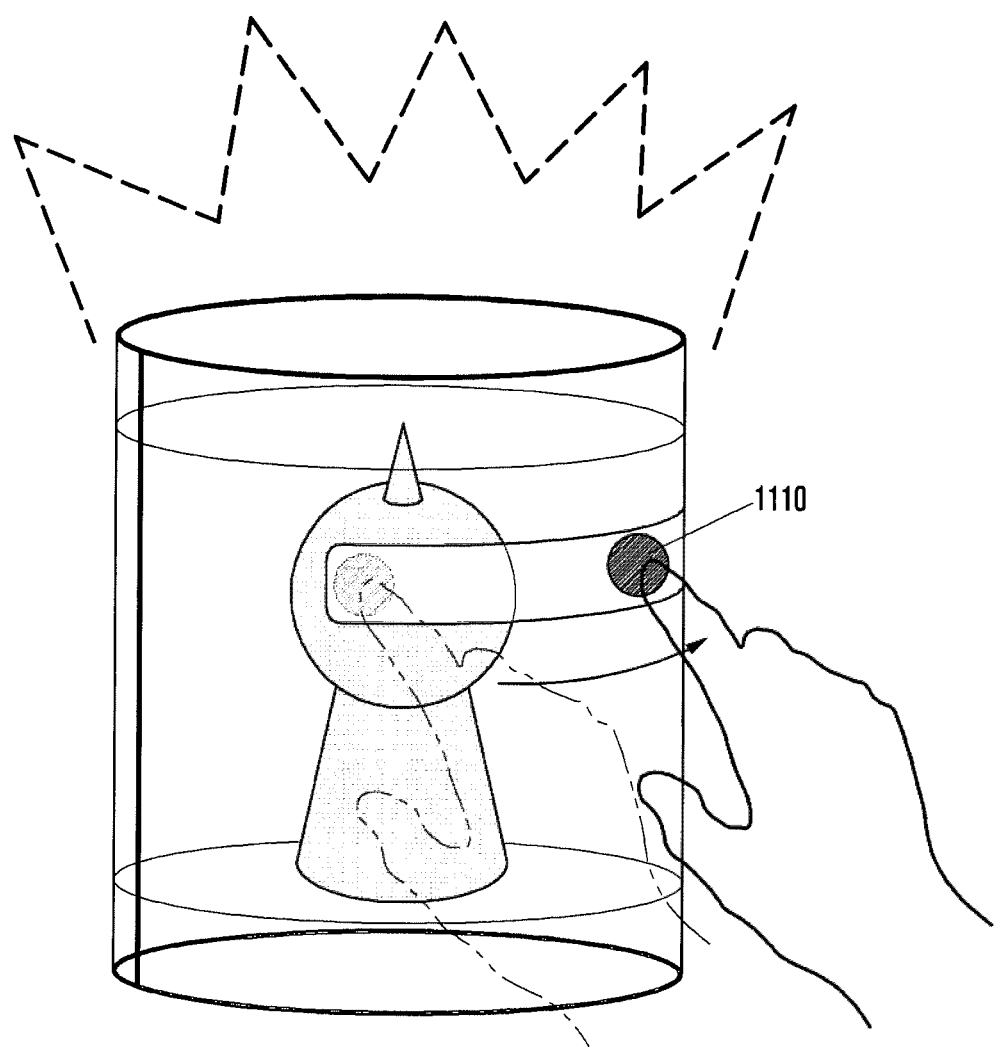

FIG. 9 is a flowchart illustrating an example method for analyzing a surrounding brightness and adjusting a brightness around an object in an electronic device according to this disclosure. FIGS. 10A and 10B are example views of a brightness around an object when a flexible display is used as an illumination apparatus according to this disclosure. FIGS. 11A and 11B are views illustrating an example of adjusting a brightness around an object by using a flexible display according to this disclosure.

Referring to FIG. 9, the electronic device uses the flexible display 420 as an illumination apparatus. For example, when the flexible display 420 is bent in an inward direction and surrounds an object, the control unit 440 adjusts a brightness of the flexible display 420 and use the flexible display 420 as the illumination apparatus for the object. When the camera module 410 is driven, in operation 911, the control unit 440 identifies the internal object (such as the object surrounded by the flexible display 420) by using an image (such as a preview image) which is output from the camera module 410, and analyzes a brightness around the internal object on the basis of an image which has been processed by the image processing unit 430. When the brightness around the internal object is not appropriate for capturing an image of the internal object, the control unit 440 senses, in operation 913, that the brightness is not appropriate, and in operation 915, the control unit 440 changes a mode of the flexible display 420 to a 3D image capturing mode. In operation 917, the flexible display 420 displays an appropriate brightness and an appropriate color of a 3D image which have been changed by the control unit 440. In operation 919, the control unit 440 measures the brightness around the internal object through the camera module 410. In operation 921, the control unit 440 determines whether the measured brightness is appropriate for capturing an image of the internal object. When the measured brightness is not appropriate for capturing an image of the internal object, the control unit 440 senses, in operation 921, that the measured brightness is not appropriate, and in operation 923, the control unit 440 adjusts the brightness and a color of the flexible display 420. Accordingly, the flexible display 420 displays the changed brightness and color thereof. In operation 919, the control unit 410 measures the brightness around the internal object through the camera module 410. When the brightness around the internal object becomes appropriate for capturing an image of the internal object through repeatedly performing the above-described operations, in operation 921, the control unit 440 senses that the brightness is appropriate and completes the brightness adjustment process.

Accordingly, when an image is captured in order to generate a 3D image, the electronic device provides the brightness appropriate for the image-capturing by using the display 420. When the brightness is low, the electronic device drives the display 420 so as to have a bright-colored screen and provides the illumination of the object. Alternatively, when the display 420 is a display (such as a transparent flexible display) that allows external illumination to pass through the display and reach the object, the brightness around the object is higher than an appropriate brightness. When the brightness around the object is higher than the appropriate brightness as described above, the control unit 440 controls the display 420 to display a dark-colored screen and adjust the brightness around the object so as to have the appropriate brightness. At this time, in order to provide the appropriate brightness, the control unit 440 provides an output value corresponding to an information value, which has been detected by the image processing unit 430, on the basis of a preset light source table.

Referring to FIGS. 10A and 10B, the brightness around the object is affected by the display which surrounds the object. For example, the display 420 completely surrounds the object as illustrated in FIG. 10A, or partially surrounds the object as illustrated in FIG. 10B. Here, the display 420 is a transparent display or an opaque display. When the display 420 is an opaque display, the electronic device causes a screen brightness of the display 420 to be bright and adjusts the brightness around the object so as to have appropriate brightness. Alternatively, when the display 420 is a transparent display, the electronic device causes the screen brightness of the display 420 to be dark and adjusts the brightness around the object so as to have appropriate brightness.

When the brightness around the object is not appropriate, the electronic device use a method for automatically adjusting the brightness (such as the screen brightness of the display 420) according to a value in a preset table, or a user of the electronic device manually adjusts the screen brightness of the display 420. Here, when the display 420 is a transparent display, as illustrated in FIGS. 11A and 11B, the display 420 displays a separate control bar 1110 for controlling the screen brightness thereof. When an image of the object is captured, the screen brightness of the display 420 is adjusted through the control bar 1110, and thereby the brightness around the object is adjusted.

When an image is captured by using the illumination adjusted by the display 420 as described above, if the electronic device is placed in the shape of a circle as illustrated in FIG. 10A, due to opposite-side illumination or illumination around the cameras (such as backlight, overexposure, or the like), the cameras of the camera module 410 facing the display 420 capture an image of the object that the user does not intend to capture. Accordingly, when the object is illuminated by the display 420 in the state where the electronic device surrounds the object in the shape of a circle, the electronic device produces a desired illumination effect by dividing the display area of the display 420 and adjusting the screen brightness of the display 420.

Figure 12:
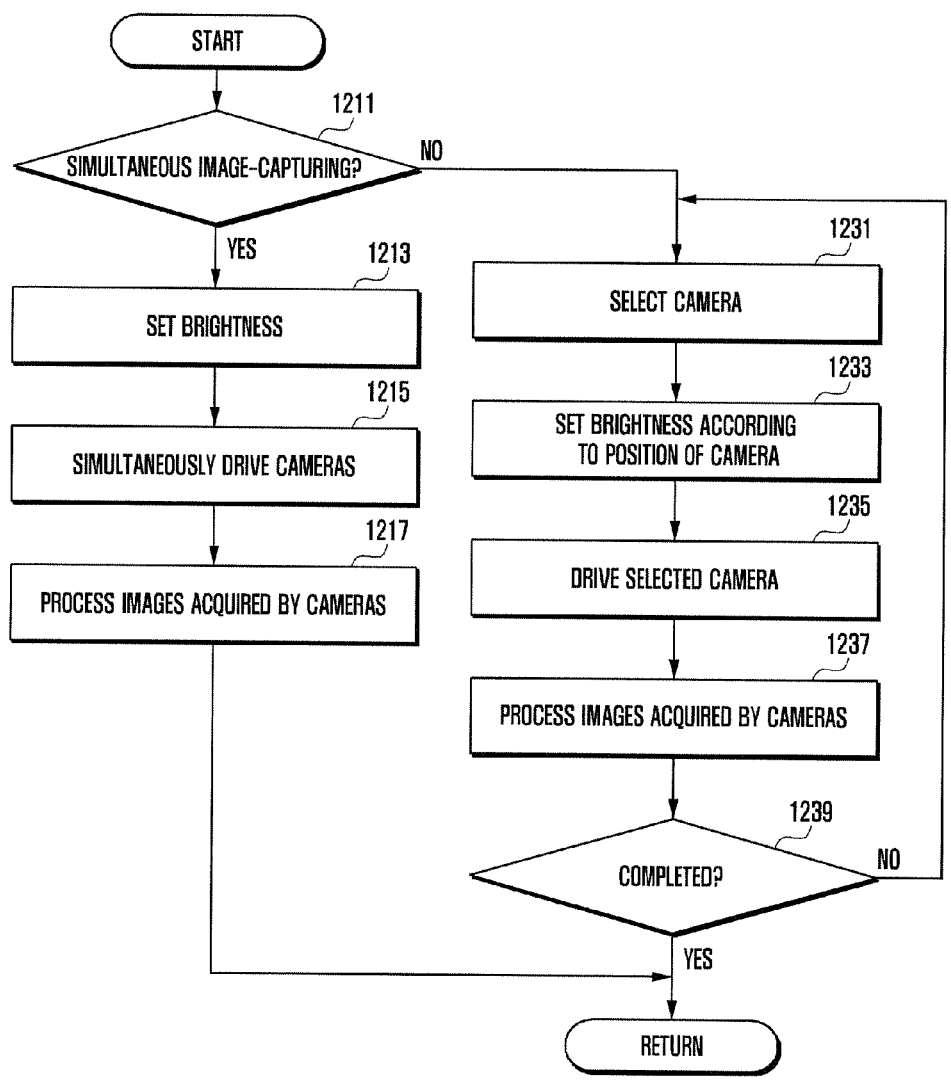
FIG. 12 is a flowchart illustrating an example method for controlling an illumination of an object through a display in an electronic device according to this disclosure.
Figure 13A:
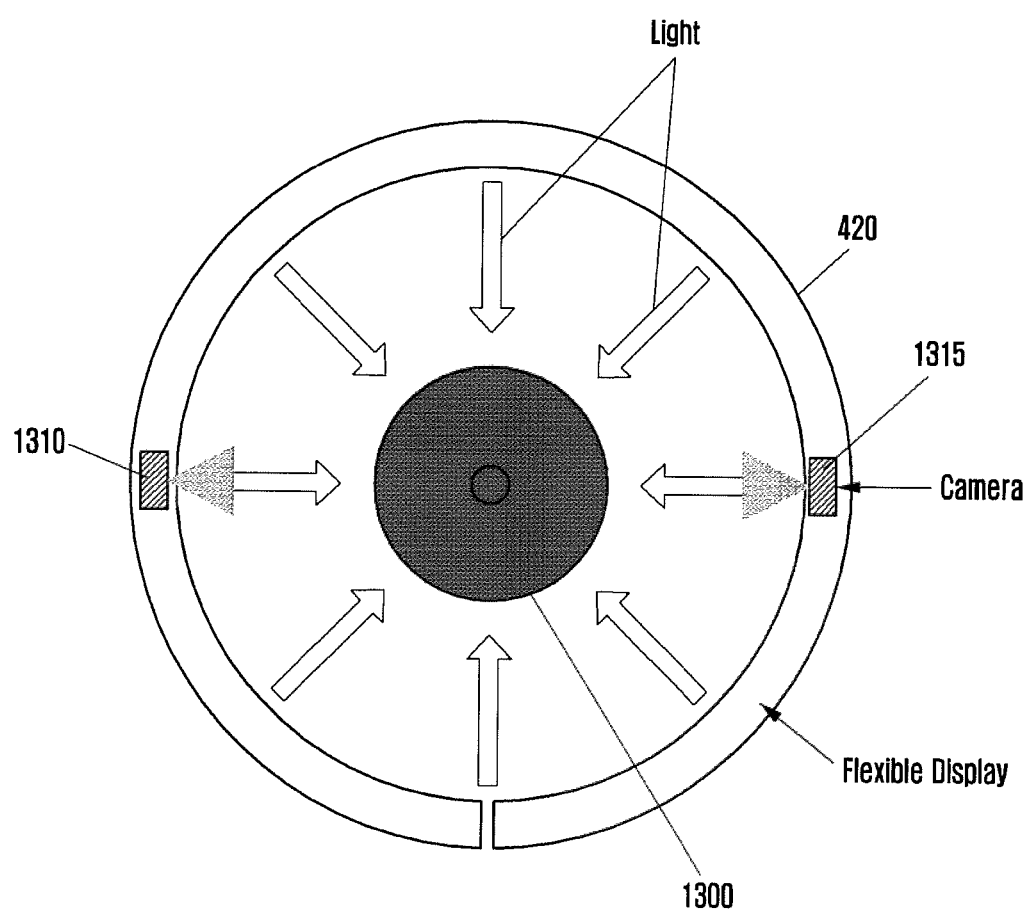
FIGS. 13A, 13B, and 13C are views illustrating an example of controlling an illumination through a display according to this disclosure.
Figure 13B:
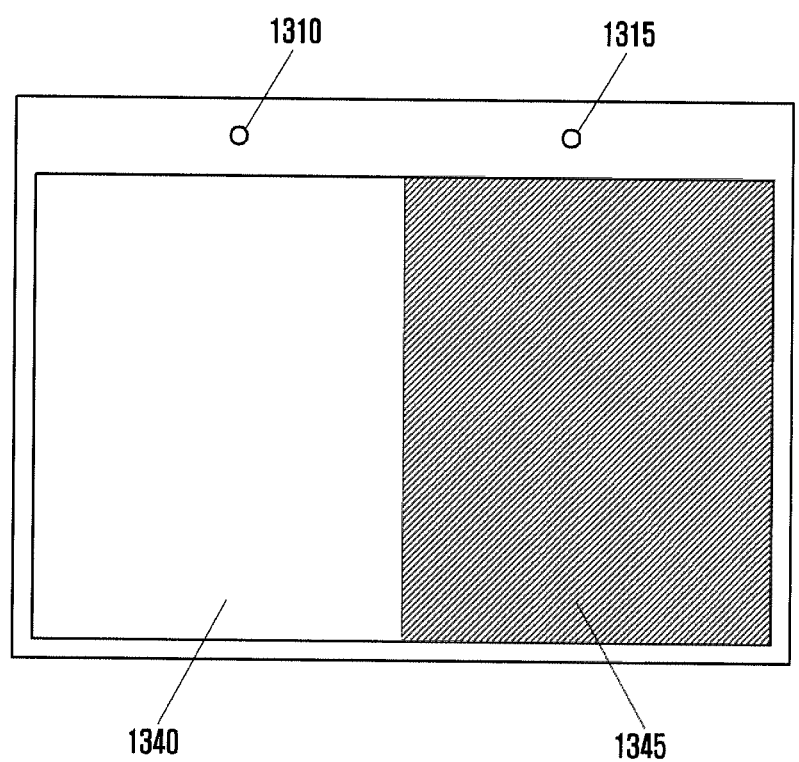
Figure 13C:
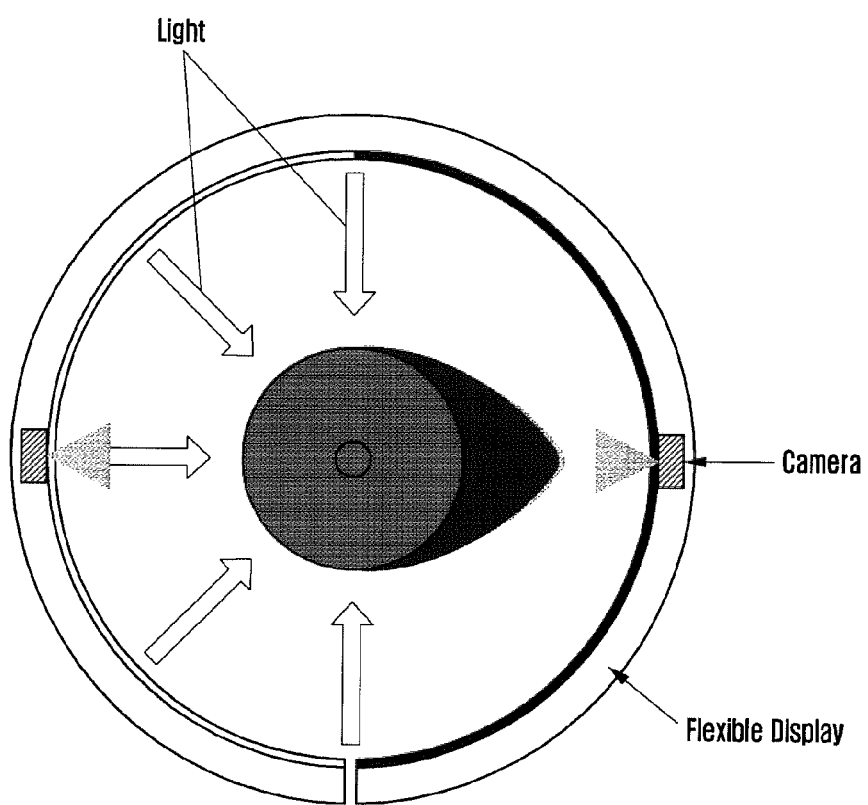

FIG. 12 is a flowchart illustrating an example method for controlling an illumination of an object through a display in an electronic device according to this disclosure. FIGS. 13A, 13B, and 13C are views illustrating an example of controlling an illumination through a display according to this disclosure. FIGS. 14A, 14B, 14C, 14D, and 14E are views illustrating an example of driving a camera and a display when an illumination is controlled through a display according to this disclosure. Here, an example will be described in which the electronic device has the configuration illustrated in FIG. 4.

The control unit 440 drives the cameras of the camera module 410 simultaneously or sequentially according to the bending of the display 420. For example, when the display 420 surrounds an object 1300 as illustrated in FIG. 13A, light generated by the display 420 is irradiated to all directions of the object 1300. In this case, when a camera 1310 or 1315 captures an image of the object 1300, overexposure occurs due to light (such as backlight) from a part of the display 420 on the opposite side of the camera 1310 or 1315. Accordingly, when the display 420 surrounds the object 1300 as illustrated in 13A, the control unit 440 prevents the backlight in a case where the display 420 is used as an illumination apparatus, in such a manner that as illustrated in 13B, the control unit 440 turns off an opposite screen 1345 of the display 420 when driving the camera 1310 or the control unit 440 turns off an opposite screen 1340 of the display 420 when driving the camera 1315. For example, when the control unit 440 captures an image of the object through the camera 1310 in a state where the display 420 surrounds the object 1300 as illustrated in FIG. 13C, the control unit 440 divides a display area of a screen of the display 420 into parts, turns on the partial display area at a position where the camera 1310 is located, turns off the partial display area on the opposite side of the camera 1310, and thereby captures an image of the object 1300 through the camera 1310.

The control unit 440 determines a degree, by which the display 420 surrounds the object 1300, according to the bending of the display 420 and controls the cameras of the camera module 410 to simultaneously or sequentially capture images of the object 1300. For example, when the display 420 completely surrounds the object 1300 as illustrated in FIG. 10A, the control unit 440 controls the cameras of the camera module 410 to sequentially capture images of the object 1300. When the display 420 surrounds a partial area of the object 1300 as illustrated in FIG. 10B and backlight does not occur during image-capturing by the camera module 410, the control unit 440 controls the cameras of the camera module 410 to simultaneously capture images of the object 1300. When the display 420 is used as an illumination apparatus for the object 1300, if the bending of the display 420 does not affect the cameras of the camera module 410 (such as when the display 420 is bent so as to surround half of the object 1300 or less than half of the object 1300 as illustrated in FIG. 10B), the control unit 440 determines simultaneous image-capturing in operation 1211, and sets a brightness in operation 1213. At this time, a method for setting the brightness is performed by using the method illustrated in FIG. 9. After the brightness is set, in operation 1215, the control unit 440 simultaneously drives the cameras of the camera module 410. In operation 1217, the control unit 440 controls the image processing unit 430 to process images which are output from the camera module 410.

However, when the bending of the display 420 affects the cameras of the camera module 410 (such as when the screen of the display 420 serves as backlight in the cameras), in operation 1211, the control unit 440 senses that the bending of the display 420 affects the cameras of the camera module 410 and performs a sequential image-capturing mode. In operation 1231, the control unit 440 selects a camera (such as an image sensor) to be driven in the camera module 410, and in operation 1233, sets a brightness by driving a partial display area of the display 420 at a position where the selected camera is located. At this time, the control unit 440 turns off the driving of a partial display area of the display 420 which is located on the opposite side of an area where the selected camera is located. In operation 1235, the control unit 440 drives the selected image sensors. In operation 1237, the control unit 440 controls the image processing unit 430 to process images which are output from the image sensors. When all the cameras of the camera module 410 are not driven, in operation 1239, the control unit 440 senses that all the cameras of the camera module 410 are not driven and returns to operation 1231, and repeatedly performs the image-capturing operation. For example, when the display 420 surrounds the object 1300 as illustrated in FIG. 13A, the control unit 440 first selects the camera 1310, turns on the screen area 1340 at the position where the camera 1310 is located in the display 420 and turns off the screen area 1345 on the opposite side of the camera 1310 as illustrated in FIG. 13C, and then captures an image of the object 1300 through the camera 1310 by driving the camera 1310. Thereafter, the control unit 440 first selects the camera 1315, turns on the screen area 1345 at the position where the camera 1315 is located in the display 420 and turns off the screen area 1340 on the opposite side of the camera 1315 as illustrated in FIG. 13C, and then captures an image of the object 1300 by driving the camera 1315. When the image-capturing has been completed, in operation 1239, the control unit 440 senses the completion of the image-capturing, and completes the image-capturing process.

When the sequential image-capturing is performed, as illustrated in 13B, the control unit 440 displays the partial area 1340 (such as a screen area at a position where a driven camera is located) of the display area of the display 420 so as to be white, and displays the remaining area 1345 (such as a screen area located on the opposite side of the driven camera) so as to be black. The display area is divided in half as described above. Alternatively, as the need arises, the user divides the display area into three or more parts, or divides an optional area of the display area. Also, the user optionally designates or changes the color and brightness of each of the divided parts.

If the object is illuminated as in an example illustrated in FIG. 13B when the object is illuminated by using the display 420 as illustrated in FIG. 13A, as illustrated in FIG. 13C, the illumination causes the front surface of the object 1300 to be bright and causes the rear surface thereof to be dark. At this time, the control unit 440 captures images of the object 1300 by simultaneously driving all the cameras of the camera module 410. Accordingly, images of the object 1300 of which one half is bright images and the other half is shady images is acquired. After the bright images and the shady images are acquired as described above, the bright images and the shady images is synthesized into one image through image processing, and the synthesized image is converted into a 3D image. The generated 3D image is a 3D image which has a bright surface and a dark surface according to the illumination. Accordingly, a 3D image having shade is generated in such a manner that the cameras of the camera module 410 are simultaneously driven in the state of driving the screen of the display 420 as illustrated in FIG. 13C and the images acquired by the camera module 410 are converted into a 3D image.

Figure 14A:
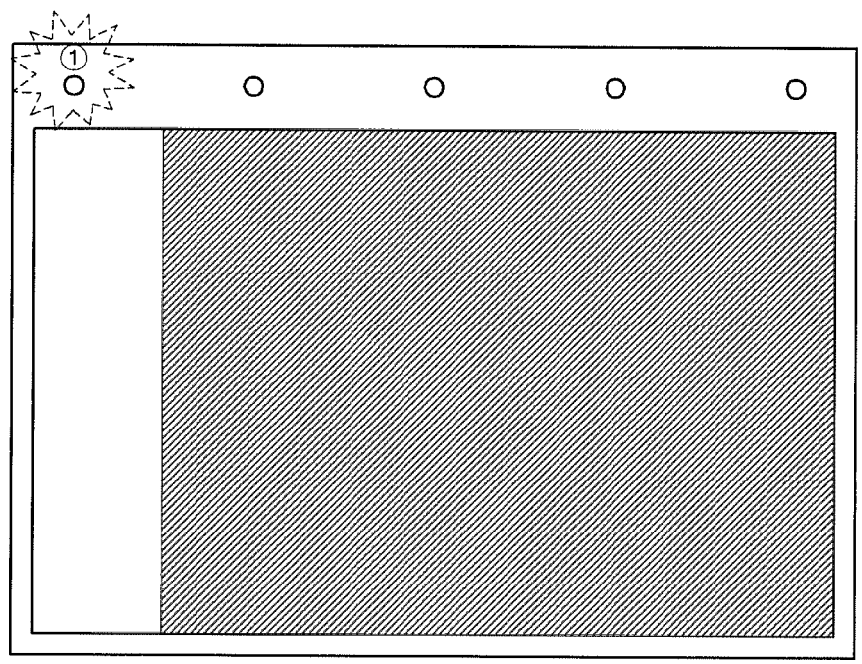
FIGS. 14A, 14B, 14C, 14D, and 14E are views illustrating an example of driving a camera and a display when an illumination is controlled through a display according to this disclosure.
Figure 14B:
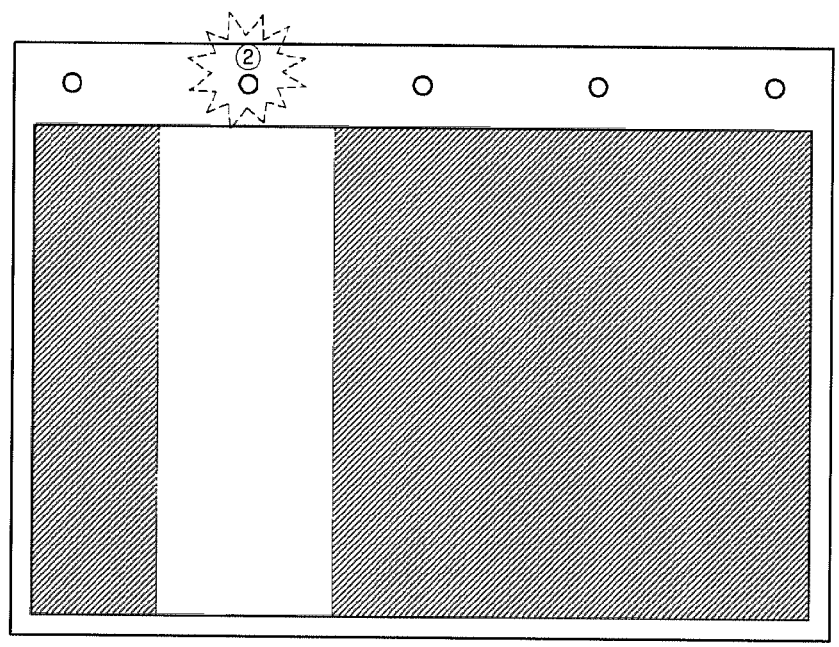
Figure 14C:
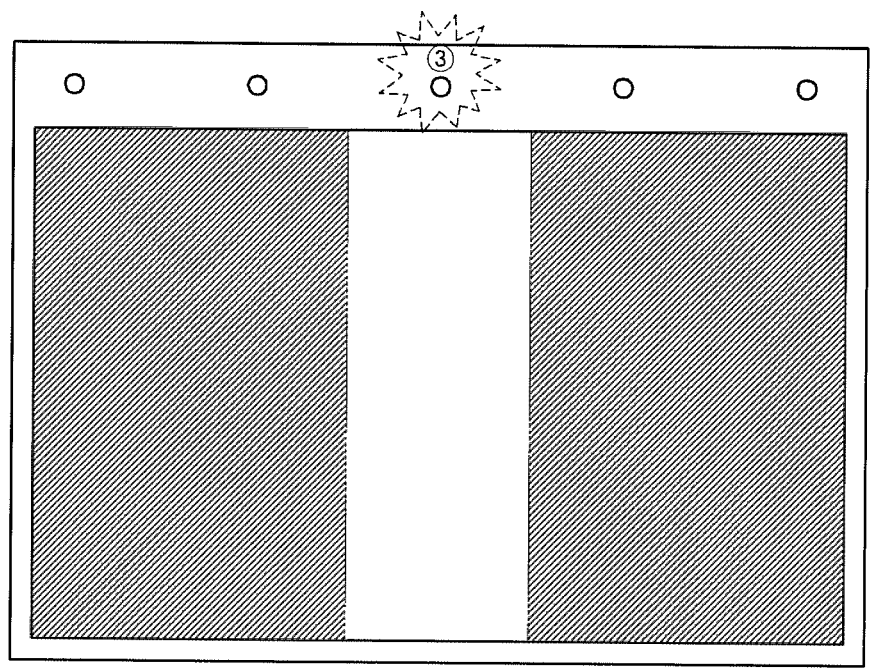
Figure 14D:
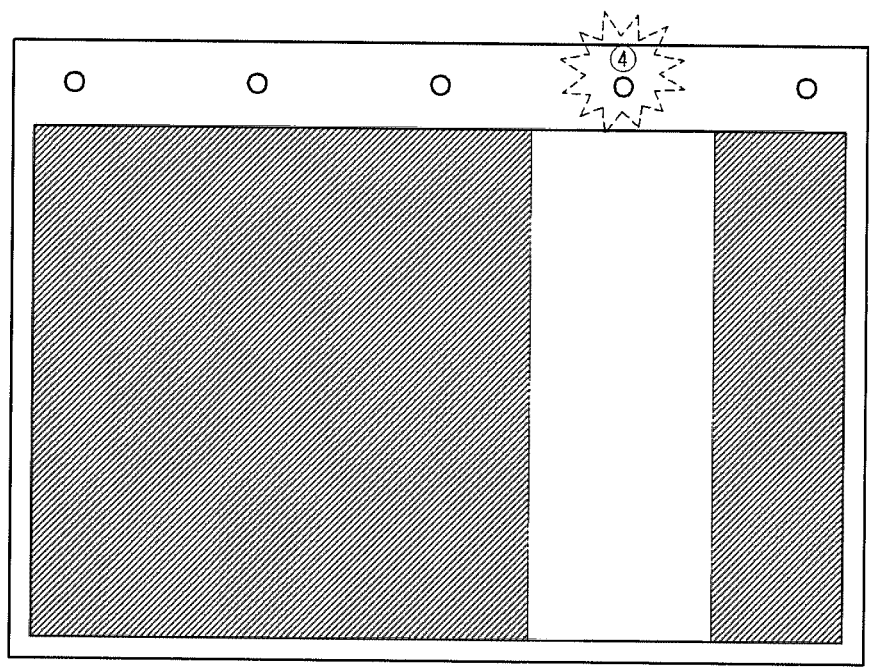
Figure 14E:
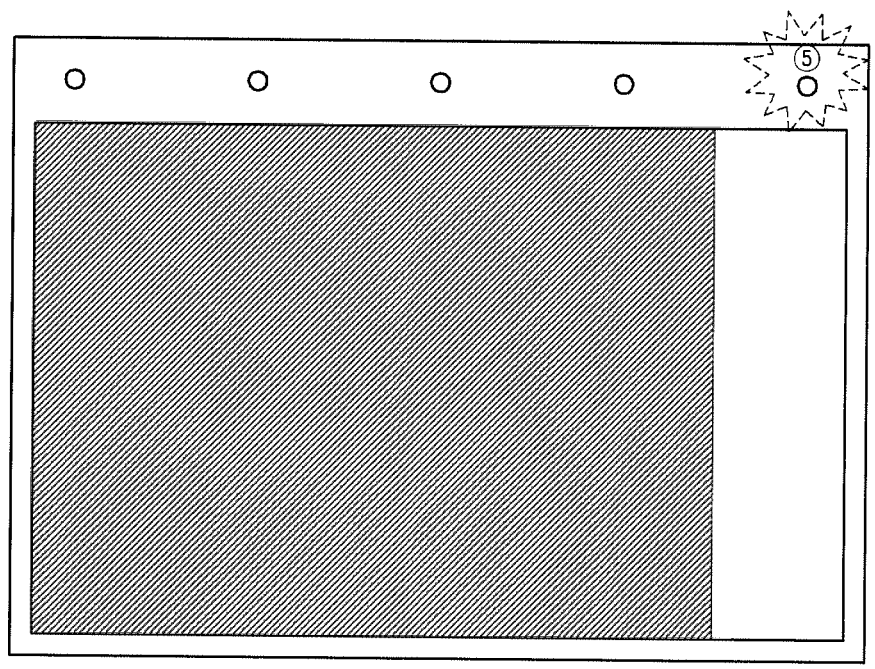

In another method for capturing an image, more various pieces of content is acquired by allowing the array camera to sequentially capture images of the object 1300 and by setting a corresponding illumination area for a camera of the array camera which captures an image of the object 1300. Such another method is performed by using a method in which, as illustrated in FIGS. 14A and 14E, the parts of the display area of the display 420 are set to be mapped to the cameras of the camera module 410 and a corresponding screen area of the display 420 is driven together when a camera is driven. Accordingly, the display 420 displays a partial screen area, which is set below the driven camera, so as to be bright, and displays the remaining screen area so as to be dark. In this regard, 3D content having an entire surface, which is bright without backlight or overexposure, is acquired when the display area of the display 420 is set to be bright and the partial display area below the corresponding camera is set to be bright according to the cameras which sequentially capture images of the object 1300.

Figure 15:
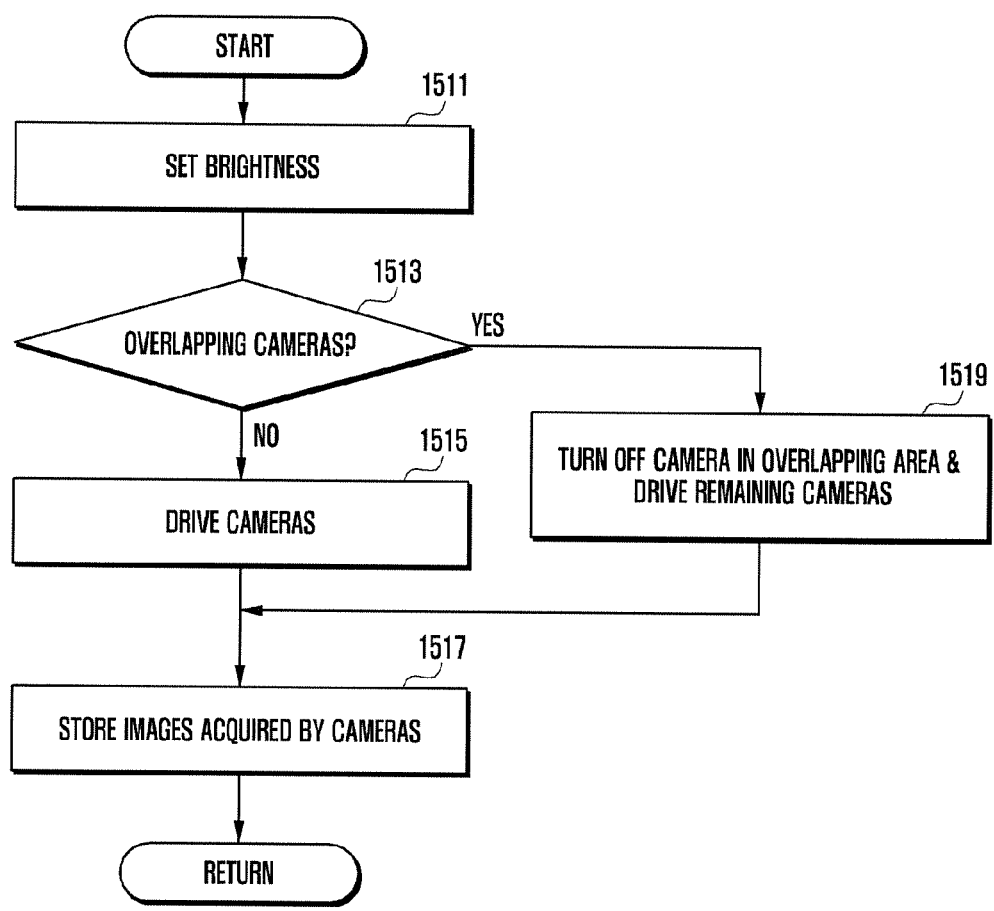
FIG. 15 is a flowchart illustrating an example method for capturing an image when cameras overlap each other due to the bending of an electronic device according to this disclosure.

FIG. 15 is a flowchart illustrating an example method for capturing an image when cameras overlap each other due to the bending of an electronic device according to this disclosure. FIGS. 16A, 16B, 16C, and 16D are views of an example method for driving cameras which overlap each other due to the bending of an electronic device according to this disclosure. Here, the electronic device will be described with reference to FIG. 4.

Figure 16A:
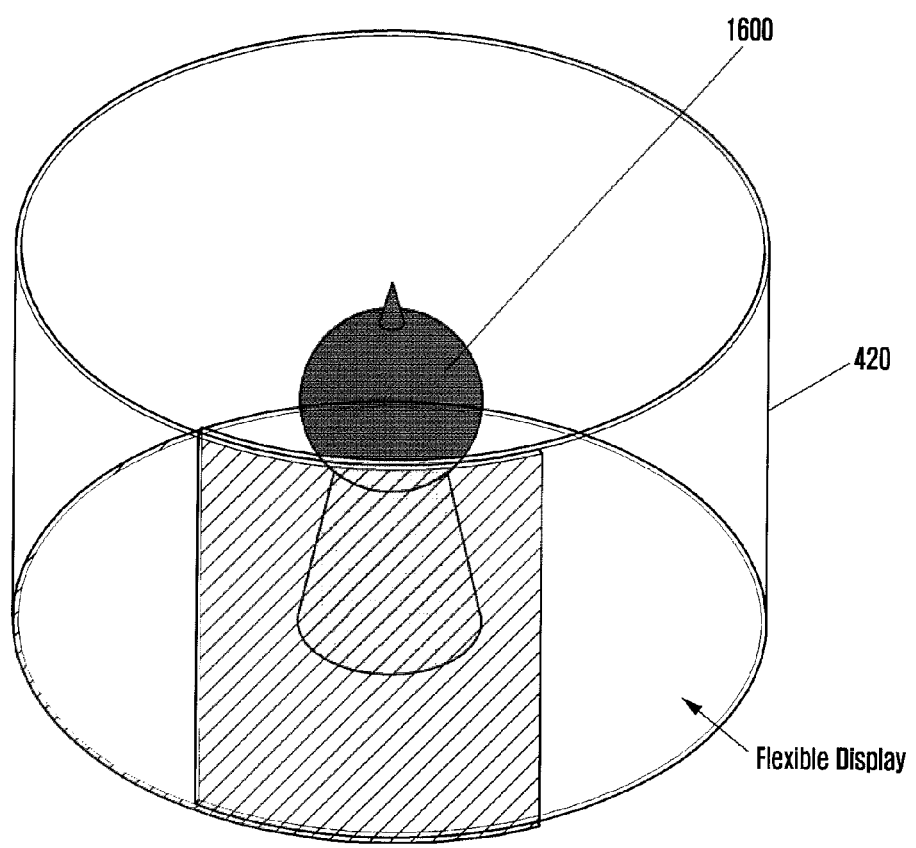
FIGS. 16A, 16B, 16C, and 16D are views of an example method for driving cameras which overlap each other due to the bending of an electronic device according to this disclosure.
Figure 16B:
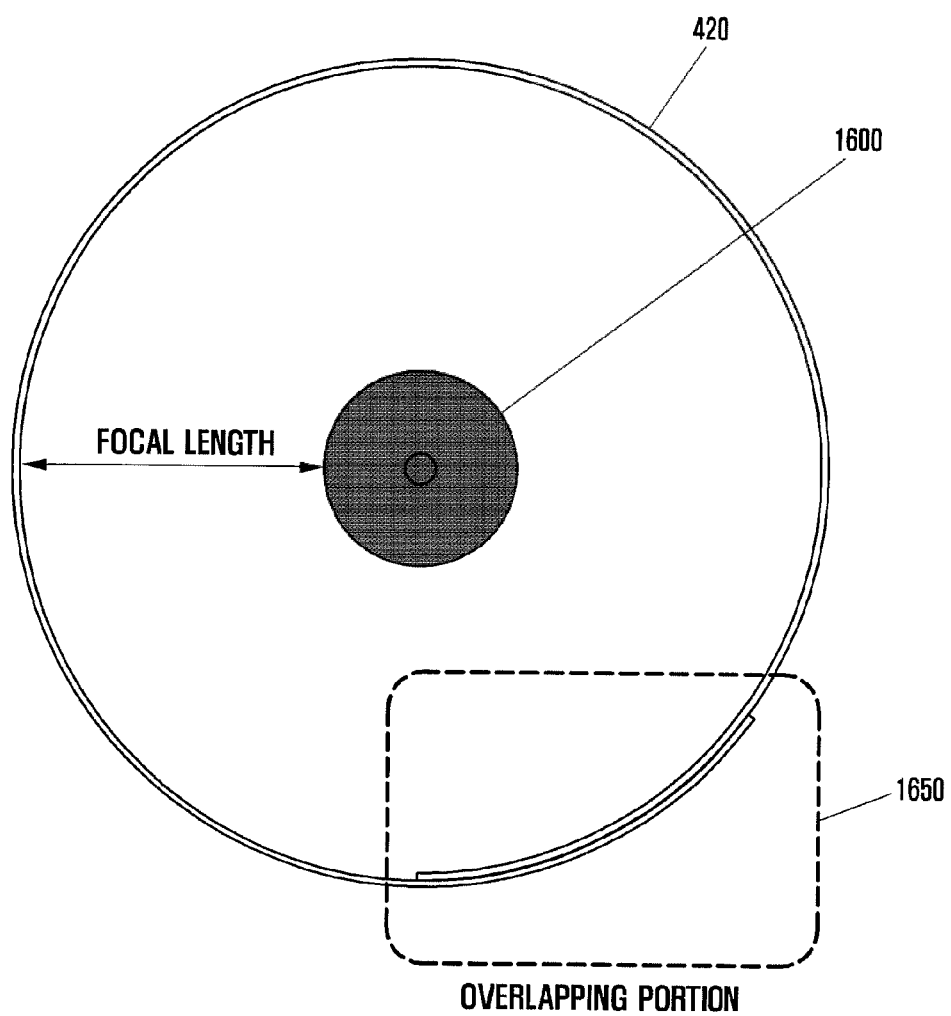

When an image of an object is captured by the electronic device including the flexible display 420 and the camera module 410 including the array camera, if the size of the object is large or small, partial areas of the electronic device overlaps as illustrated in FIG. 16A. For example, when an object 1600 is located in the center of the electronic device and the flexible display 420 is rolled and placed in the shape of a circle as illustrated in FIG. 16B, partial areas of the flexible display 420 overlaps as indicated by reference numeral 1650. When some of the cameras of the camera module 410 are placed in the overlapping area 1650, a camera placed on a rear surface of the overlapping area 1650 may not capture an image of the object 1600. Accordingly, when the electronic device is rolled in the shape of a circle and captures an image of the object 1600, a camera (such as a camera capable of focusing on the object) placed on a front surface of the overlapping area 1650 is driven differently from the camera (such as the camera not capable of focusing on the object) placed on the rear surface of the overlapping area 1650.

Figure 16C:
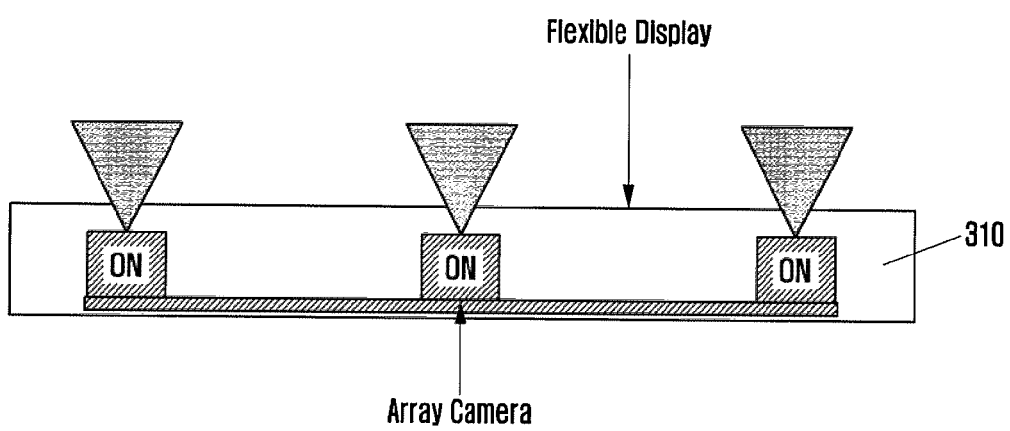
Figure 16D:
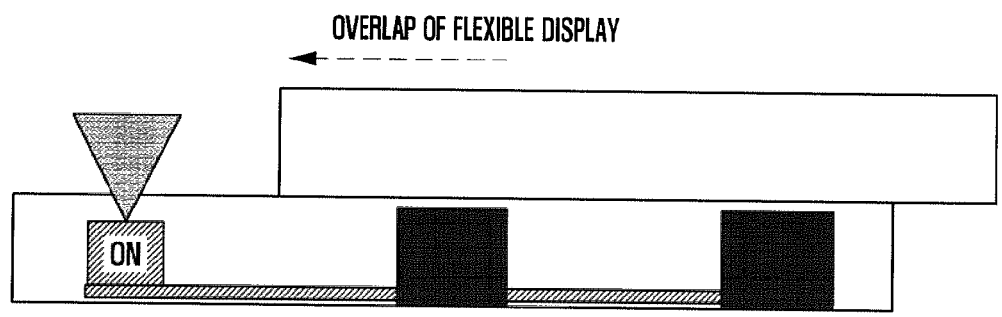

When an image of the object is captured, in operation 1511, the control unit 440 drives the display 420 and sets a brightness for capturing an image of the object. Then, the control unit 440 determines whether partial areas of the electronic device overlap. When the overlapping area is not generated in the display 420 as illustrated in FIG. 16C, the control unit 440 senses, in operation 1513, that the overlapping area is not generated in the display 420, and in operation 1515, drives the relevant cameras and turns on partial screen areas of the display 420 respectively corresponding to the driven cameras. In operation 1517, the control unit 440 controls the image processing unit 430 to buffer images which are output from the camera module 410. When the overlapping area is generated in the display 420 and thus there is a camera placed on the rear surface of the overlapping area of the display 420 as illustrated in FIG. 16D, the control unit 440 senses, in operation 1513, the existence of the camera placed on the rear surface of the overlapping area, and in operation 1519, turns off the camera and a partial screen area of the display 420, which are located in the overlapping area, and drives the remaining cameras. The control unit 440 controls the image processing unit 430 to buffer images acquired by the display 420 and the camera module 410 driven as described above. When the driving of the remaining cameras has been completed, as described above, the images is synthesized and then a 3D image is generated from the synthesized image.

As described above, when the partial areas of the flexible display 420 overlap, the control unit 440 recognizes the overlapping portion, and may not operate the camera located on the rear surface of the overlapping area of the flexible display 420. Accordingly, desired 3D content is acquired in such a manner as to operate only a necessary number of cameras from among the cameras mounted on the electronic device. At this time, the control unit 440 senses the overlapping area by using an output from an image sensor of the camera module 410, and may not operate the cameras located within the overlapping area when an image of the object is captured. Examples of a method for sensing the overlapping area includes various methods, such as a method for sensing the overlapping area through a camera lens, a method using a separate sensor, and the like.

Figure 17:
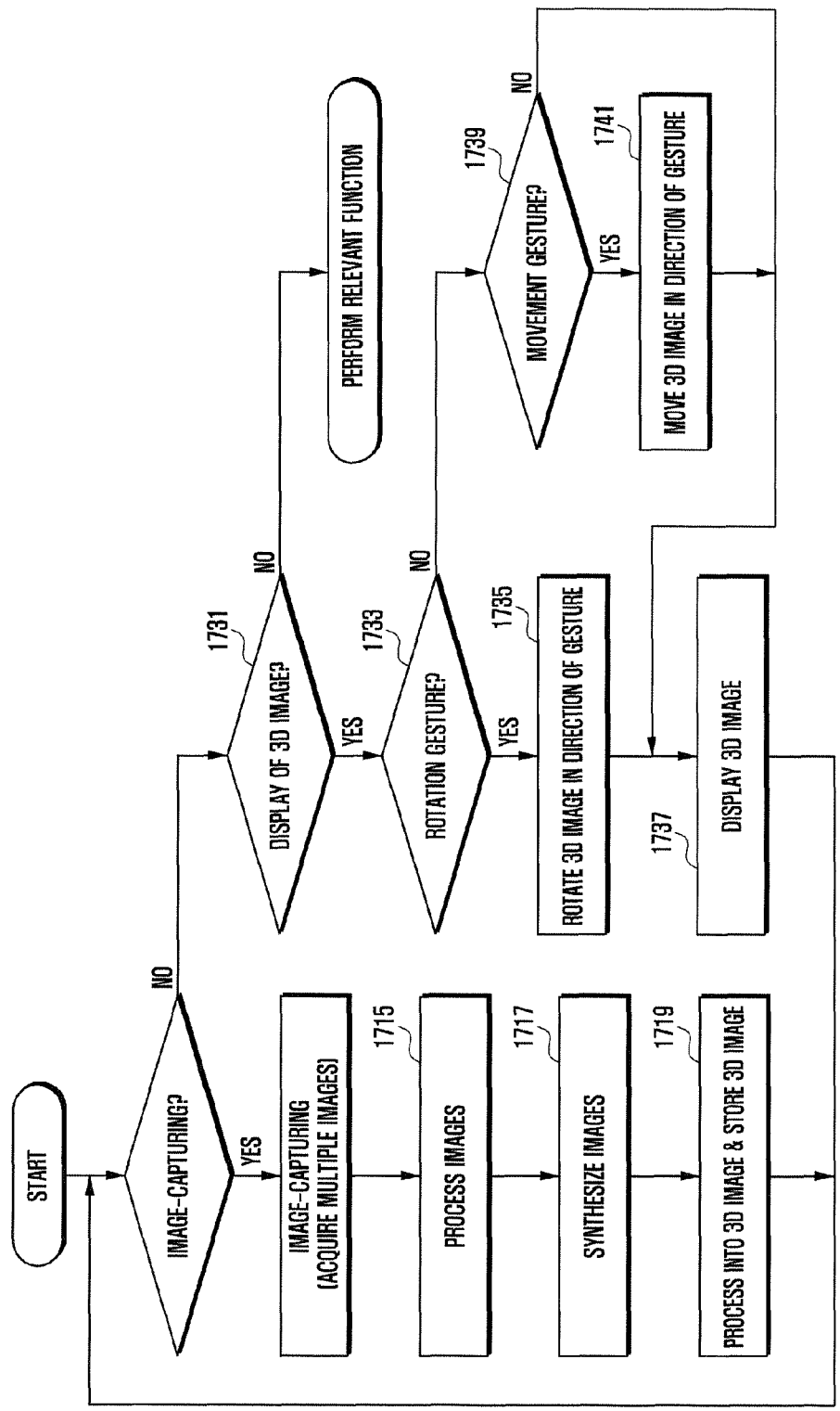
FIG. 17 is a flowchart illustrating an example method for capturing an image and displaying the captured image in an electronic device including a flexible display and an array camera according to this disclosure.
Figure 18A:
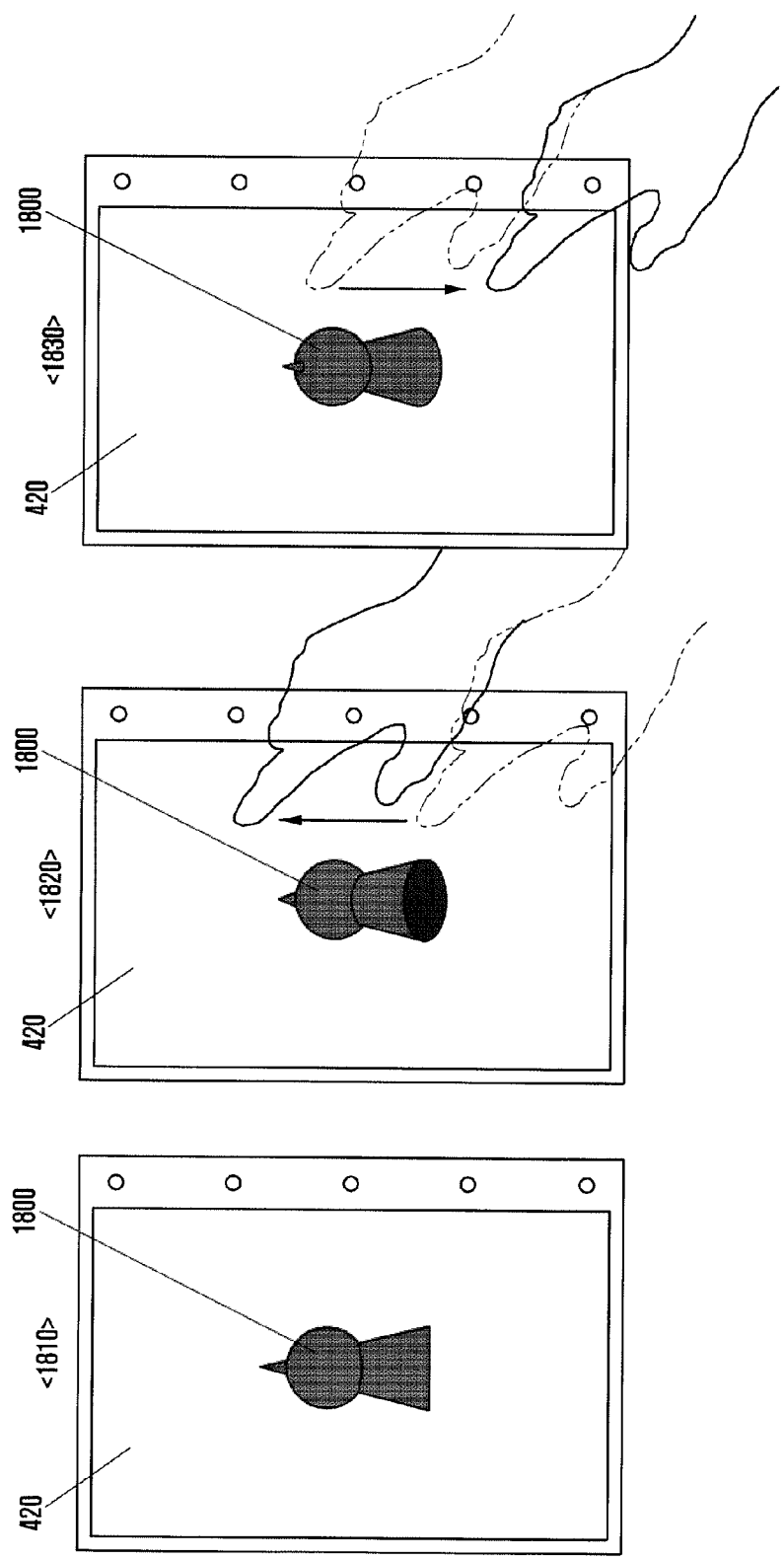
FIGS. 18A and 18B are views of an example method for displaying a 3D image according to this disclosure.
Figure 18B:
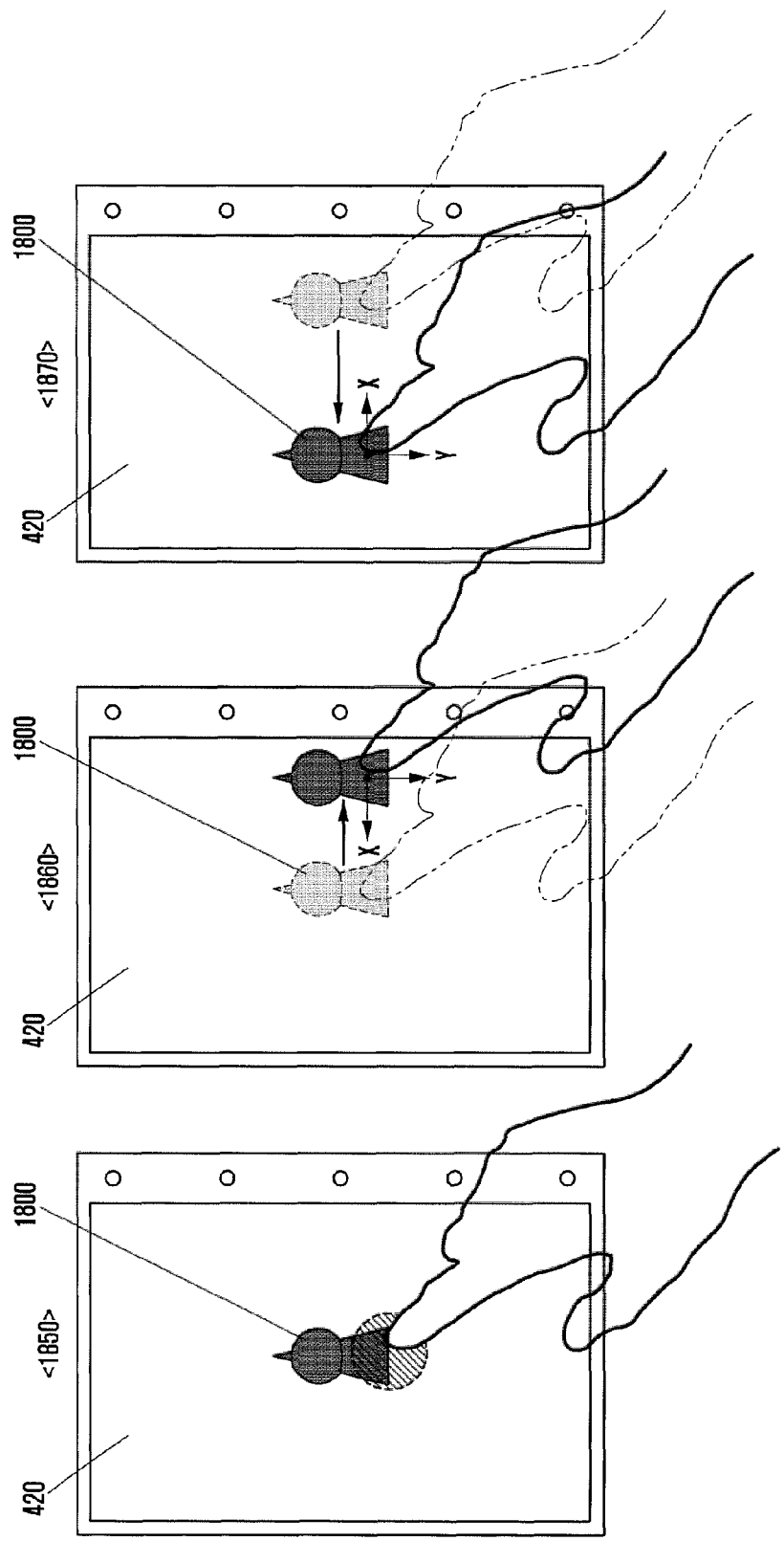

FIG. 17 is a flowchart illustrating an example method for capturing an image and displaying the captured image in an electronic device including a flexible display and an array camera according to this disclosure. FIGS. 18A and 18B are views of an example method for displaying a 3D image according to this disclosure. When an image of the object is captured, the control unit 440 controls the display 420 and the camera module 410 to capture an image of the object. When an image of the object is captured, the control unit 440 drives the display 420 and uses the display 420 as an illumination apparatus for the object. Also, the control unit 440 prevents overexposure due to backlight by turning on/off the parts of the screen area of the display 420 according the driving of the camera module 410. Further, when the display 420 is used as the illumination apparatus, the control unit 440 performs a control operation for capturing an image of the object so as to have shade by turning on a partial screen area facing the object and turning off the remaining screen area. In addition, when the display 420 has an overlapping area, the control unit 440 turns off the driving of cameras placed a rear surface of the overlapping area of the display 420.

The camera module 410 is an array camera, and thus multiple images are output from the camera module 410. Under the control of the control unit 440, the image processing unit 430 pre-processes and post-processes the images in operation 1715, synthesizes the processed images into one image in operation 1717, and generates a 3D image from the synthesized image in operation 1719.

When a request is made for displaying the 3D image generated as described above, in operation 1731, the control unit 440 senses the request, and displays the 3D image through the display 420. The 3D image displayed by the display 420 is rotated or moved according to a set gesture input. For example, a rotation gesture is performed through the drag-and-drop of an area in which the 3D image is not displayed on the screen of the display 420. A movement gesture is performed through drag-and-drop after the touch of the 3D image displayed by the display 420. When the rotation gesture is sensed in operation 1733, in operations 1735 and 1737, the control unit 440 rotates the 3D image in a direction of occurrence of the rotation gesture and displays the rotated 3D image. Referring to FIG. 18A, when a rotation gesture in an upward direction is sensed on the screen as indicated by reference numeral 1820 in a state of displaying a 3D image 1800 on the screen as indicated by reference numeral 1810, the control unit 440 rotates the 3D image 1800 in the upward direction. In contrast, when a rotation gesture in a downward direction is sensed on the screen as indicated by reference numeral 1830, the control unit 440 rotates the 3D image 1800 in the downward direction.

When the movement gesture is sensed, in operations 1739 and 1741, the control unit 440 moves the 3D image in the direction of occurrence of the movement gesture, and displays the moved 3D image. Referring to FIG. 18B, when a movement gesture in a right direction is sensed on the screen as indicated by reference numeral 1860 after the 3D image 1800 is touched in a state of displaying the 3D image 1800 on the screen as indicated by reference numeral 1850, the control unit 440 moves the 3D image 1800 in the right direction. In contrast, when a movement gesture in a left direction is sensed on the screen as indicated by reference numeral 1870, the control unit 440 moves the 3D image 1800 in the left direction.

Figure 20A:
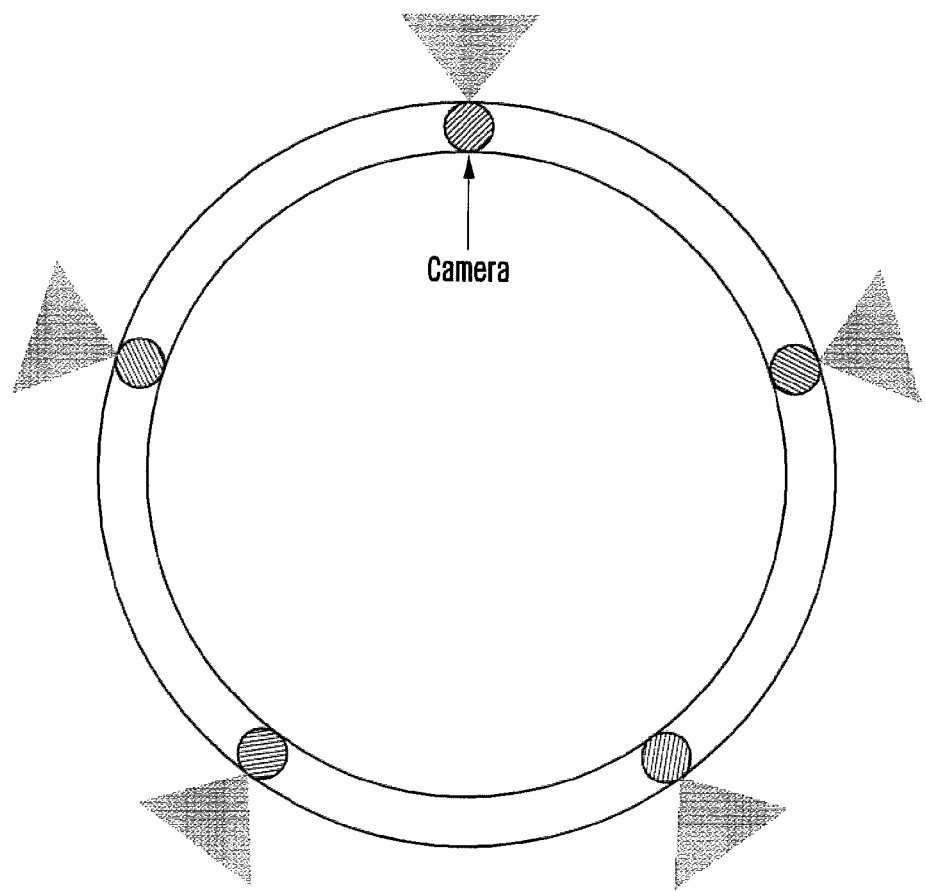
FIGS. 20A and 20B are views of an example of capturing an image according to a bending direction of an electronic device according to this disclosure.
Figure 20B:
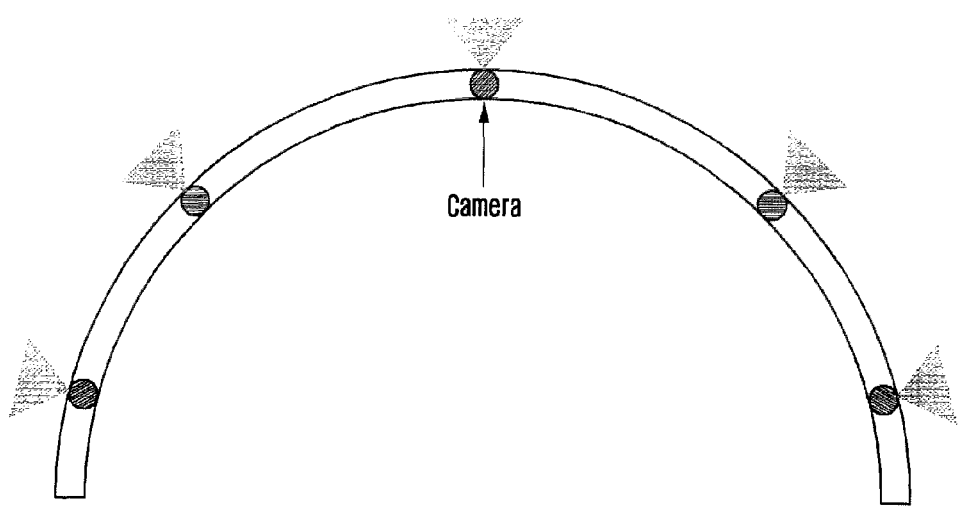

FIG. 19 is a flowchart illustrating an example method for capturing an image in an electronic device including a flexible display and an array camera according to this disclosure. FIGS. 20A and 20B are views of an example of capturing an image according to a bending direction of an electronic device according to this disclosure. Here, the electronic device for capturing an image will be described with reference to FIG. 4.

The flexible display 420 enables the camera module 410 to be bent in the inward direction, or enables the camera module 410 to be bent in the outward direction as illustrated in FIGS. 20A and 20B. The electronic device processes images, which have been captured according to the bending direction of the flexible display 420 and a direction that the camera module 410 faces, into a 2D image or a 3D image. For example, when the flexible display 420 is bent such that the camera module 410 faces the inward direction, the camera module 410 focuses on one object located in the center of the electronic device. In contrast, when the flexible display 420 is bent such that the camera module 410 faces the outward direction, the camera module 410 focuses on objects located around the electronic device.

When a request is made for driving the camera module 410 in operation 1911, in operation 1913, the control unit 440 senses a direction, in which lenses of the camera module 410 are located, according to the bending direction of the display 420. At this time, the bending direction of the display 420 is sensed through a bending sensor, or is sensed by analyzing the direction of the lenses of the camera module 410. When the lenses of the camera module 410 face the inward direction in operation 1915, in operation 1917, the control unit 440 captures images of the object located in the center of the electronic device, synthesizes the captured images, and processes the synthesized image into a 3D image. In contrast, when the lenses of the camera module 410 face the outward direction in operation 1921, in operation 1923, the control unit 440 captures images of the objects located around the electronic device, synthesizes the captured images, and processes the synthesized image into a 2D image. For example, when the electronic device is bent outward as illustrated in FIG. 20A, the control unit 440 generates a 360-degree panoramic image from the captured images. When the electronic device is bent outward as illustrated in FIG. 20B, the control unit 440 generates a 180-degree panoramic image from the captured images. In contrast, when the electronic device is not bent, in operation 1931, the control unit 440 processes the captured images into a normal image. Here, the normal image is a 2D image.

Accordingly, the electronic device captures the images of the internal object located in the center of the electronic device according to the bending direction of the display 420 and the direction that the camera module 410 faces, and generates a 3D image from the captured images. Alternatively, the electronic device causes the camera module 410 to face the outward direction, and acquires an image having various effects, such as a 2D image.

Figure 21:
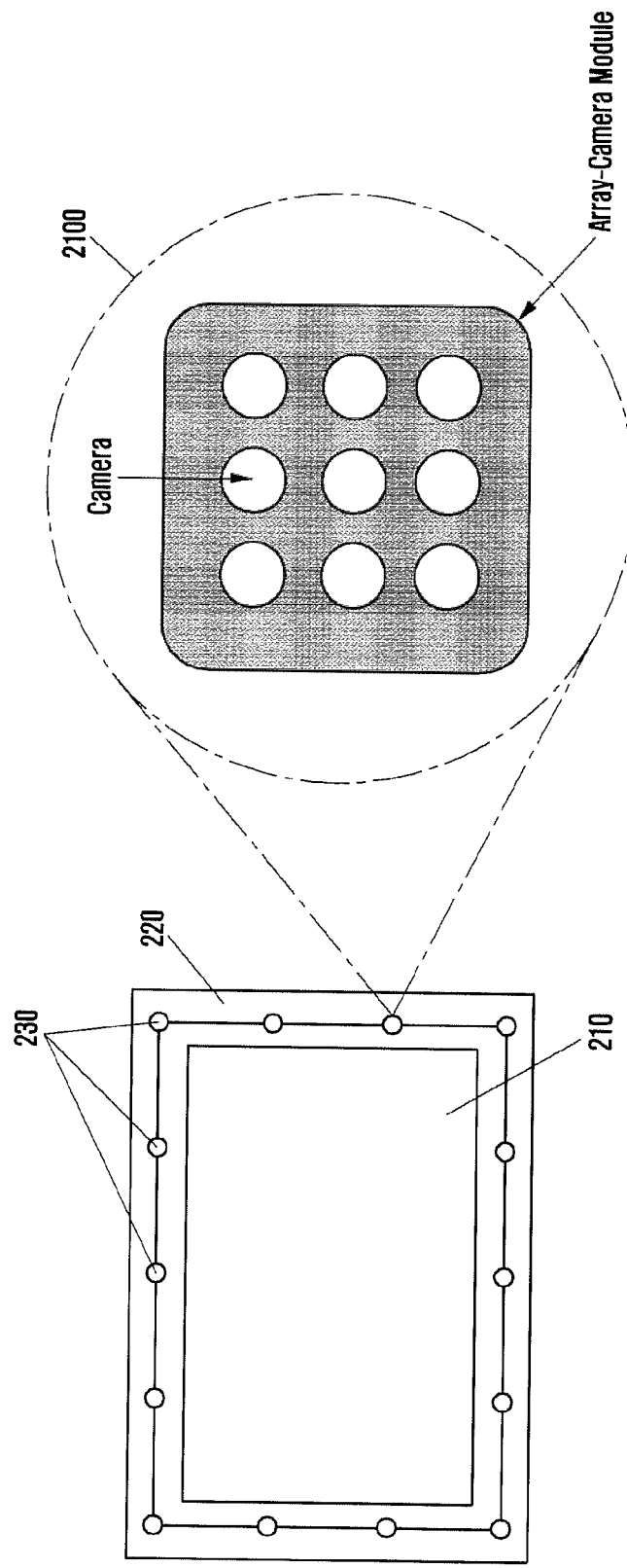
FIG. 21 is a view illustrating an example structure of an array camera mounted on a flexible display in an electronic device according to this disclosure.

FIG. 21 is a view illustrating an example structure of an array camera mounted on a flexible display in an electronic device according to this disclosure. For example, the array camera mounted on the display 210 is mounted in a line as illustrated in FIG. 2. Alternatively, the array camera is disposed in the shape of a rectangle as illustrated in FIG. 21. Alternatively, the array camera is disposed in various shapes according to functional needs. Further, each camera of the array camera disposed as illustrated in FIG. 21 is an array camera module 2100.

The method for capturing an image in the electronic device according to various embodiments of the present disclosure includes capturing images focused on an object by the camera module mounted on the flexible display capable of being bent in a direction of the object; and synthesizing the captured images and processing the synthesized image into an image of a set type. In performing the method for processing an image in the electronic device, the camera module is an array of at least two cameras connected to each other, and the process of capturing an image is performed in such a manner that, in the state of the display is bent in the direction of the object, the cameras of the camera module focus on the object located in the center of the bent display and capture multiple images of the object. The process of processing an image includes an operation of pre-processing and post-processing the multiple captured images, an operation of synthesizing the processed images into one image, and an operation of processing the synthesized image into a 3D image.

Also, the method for processing an image in the electronic device further includes an operation of analyzing the bending direction of the display. The process of processing an image includes an operation of synthesizing the captured images into one image and processing the synthesized image into a 3D image when the display is bent in the inward direction, and an operation of synthesizing the captured images into one image and processing the synthesized image into a 2D image when the display is bent in the outward direction. The process of capturing an image further includes an operation of measuring the brightness around the object and controlling a screen brightness of the display. The operation of controlling the screen brightness of the display includes an operation of sensing the brightness around the object through the camera module, and an operation of controlling the screen brightness of the display and adjusting a brightness of the object according to the sensed brightness.

In the operation of adjusting the brightness of the object, when the display surrounds the object, the cameras of the camera module is dividedly driven and a part of a display area at a position, where the camera not driven is located, is processed as a black screen. Alternatively, in the operation of adjusting the brightness of the object, when the display surrounds the object, a control operation is performed for dividing the display area of the display into parts and driving some of the partial display areas, and acquiring images of the object by simultaneously driving the cameras of the camera module. Alternatively, in the operation of adjusting the brightness of the object, when the display surrounds the object, the cameras of the camera module is sequentially driven, and the partial display areas of the display, which respectively correspond to positions of the sequentially-driven cameras, is sequentially driven.

The method for capturing an image in the electronic device according to various embodiments of the present disclosure includes measuring a brightness around an object through the camera module mounted on the flexible display capable of being bent in a direction of the object; adjusting a brightness of the object by controlling a screen brightness of the display according to the measured brightness; capturing at least two images focused on the object by driving the camera module; and synthesizing the captured images and processing the synthesized image into a 3D image.

According to various embodiments of the present disclosure, the devices (e.g. modules or their functions) or methods is implemented by computer program instructions stored in a computer-readable storage medium. In the case that the instructions are executed by at least one processor (such as processor 120), the at least one processor executes the functions corresponding to the instructions. The computer-readable storage medium is the memory 130. At least a part of the programing module is implemented (such as executed) by the processor 120. At least a part of the programing module includes modules, programs, routines, sets of instructions, and processes for executing the at least one function.

The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device is implemented with one or more software modules for executing the operations of the various exemplary embodiments of the present disclosure.

The module or programming module of the present disclosure includes at least one of the aforementioned components with omission of some components or addition of other components. The operations of the modules, programming modules, or other components is executed in series, in parallel, recursively, or heuristically. Also, some operations is executed in different order, omitted, or extended with other operations.

Although the present disclosure has been described with an exemplary embodiment, various changes and modifications is suggested to one skilled in the art. It is intended that the present disclosure encompass such changes and modifications as fall within the scope of the appended claims.

What is claimed is:

1. An electronic device comprising:
a flexible display;
a camera module comprising a plurality of cameras;
an image processing unit;
a sensor unit; and
a control unit configured to:
control, in response that the sensor unit detects a bending direction to be inward, the plurality of cameras to drive sequentially for capturing images of an object when the electronic device surrounds the object in a shape of a closed curve;
sequentially, when the plurality of cameras drive sequentially, drive parts of a display area of the flexible display that respectively correspond to positions of the sequentially-driven cameras; and
control the image processing unit to synthesize the captured images into one image and process the synthesized image into a three-dimensional (3D) image.

2. The electronic device of claim 1, wherein the electronic device includes holes, in which optical units of the cameras are capable of being located, in a bezel area of the electronic device.

3. The electronic device of claim 2, wherein the control unit is configured to control the camera module to focus on the object located in a center of the electronic device bent inward.

4. The electronic device of claim 2, wherein the control unit is configured to control, if the bending direction is outward, the image processing unit to synthesize the captured images into one image, and process the synthesized image into a two-dimensional (2D) image.

5. The electronic device of claim 2, wherein the plurality of cameras of the camera module face an identical surface, and are arranged in a line or in a form of a predetermined pattern.

6. The electronic device of claim 3, wherein the control unit is further configured to measure a brightness around the object and control a screen brightness of the flexible display.

7. The electronic device of claim 6, wherein, when the electronic device surrounds the object in a shape of a closed curve, the control unit is configured to dividedly drive the at least two cameras of the camera module, and process a part of a display area at a position, where the camera not driven is located, as a black screen.

8. The electronic device of claim 6, wherein, when the electronic device surrounds the object in a shape of a closed curve, the control unit is configured to perform a control operation for dividing a display area of the flexible display into parts and driving part of partial display areas, and acquiring the images of the object by simultaneously driving the plurality of cameras of the camera module.

9. The electronic device of claim 6, wherein the flexible display comprises a transparent display including a brightness adjustment bar, and wherein the screen brightness of the flexible display is adjusted using the brightness adjustment bar.

10. A method to capture an image in an electronic device, the method comprising:
detecting a bending direction of the electronic device;
drive sequentially, in response to the bending direction to be inward, a plurality of cameras for capturing images of an object when the electronic device surrounds the object in a shape of a closed curve;
drive sequentially, when the plurality of cameras drive sequentially, parts of a display area of a flexible display that respectively correspond to positions of the sequentially-driven cameras,
synthesizing the captured images into one image; and
processing the synthesized image into a three-dimensional (3D) image.

11. The method of claim 10, wherein capturing the images comprises focusing on the object located in a center of the electronic device bent inward and capturing images of the object by the plurality of cameras of a camera module.

12. The method of claim 11, wherein synthesizing the captured images and processing the synthesized image into the image of a set type comprises:
- pre-processing and post-processing the captured images;
- synthesizing the processed images into one image; and
- processing the synthesized image into a three-dimensional (3D) image.

13. The method of claim 11, wherein the synthesizing and the processing comprises synthesizing, if the bending direction is outward, the captured images into one image and processing the synthesized image into a two-dimensional (2D) image.

14. The method of claim 13, wherein capturing the image further comprises measuring a brightness around the object and controlling a screen brightness of a flexible display.

15. The method of claim 14, wherein controlling the screen brightness of the flexible display comprises:
- sensing the brightness around the object through the camera module; and
- adjusting a brightness of the object by controlling the screen brightness of the flexible display according to the sensed brightness.

16. The method of claim 15, wherein adjusting the brightness of the object comprises dividedly driving at least two cameras of the camera module and processing a part of a display area at a position, where the camera not driven is located, as a black screen when the flexible display surrounds the object.

17. The method of claim 15, wherein adjusting the brightness of the object comprises performing a control operation for dividing a display area of the flexible display into parts and driving part of partial display areas, and acquiring the images of the object by simultaneously driving at least two cameras of the camera module when the flexible display surrounds the object.

* * * * *